US 9,673,899 B2

(12) United States Patent
Sunnerud et al.

(10) Patent No.: US 9,673,899 B2
(45) Date of Patent: Jun. 6, 2017

(54) IN-BAND OSNR MEASUREMENT ON POLARIZATION-MULTIPLEXED SIGNALS

(71) Applicant: EXFO INC., Quebec (CA)

(72) Inventors: Henrik Sunnerud, Landvetter (SE); Mats Skold, Gothenburg (SE); Mathias Westlund, Lerum (SE)

(73) Assignee: EXFO Inc., Quebec (CA)

( * ) Notice: Subject to any disclaimer, the term of this patent is extended or adjusted under 35 U.S.C. 154(b) by 0 days.

(21) Appl. No.: 14/223,165

(22) Filed: Mar. 24, 2014

(65) Prior Publication Data
US 2015/0110486 A1   Apr. 23, 2015

Related U.S. Application Data

(60) Provisional application No. 61/893,948, filed on Oct. 22, 2013.

(51) Int. Cl.
  *H04J 14/06*   (2006.01)
  *H04B 10/079*   (2013.01)

(52) U.S. Cl.
  CPC ........ *H04B 10/07953* (2013.01); *H04J 14/06* (2013.01)

(58) Field of Classification Search
  CPC .......... H04B 10/0795; H04B 10/07951; H04B 10/07953; H04B 10/2569; H04B 10/2572; H04J 14/06
  See application file for complete search history.

(56) References Cited

U.S. PATENT DOCUMENTS 8,786,821 B2 * 7/2014 Shiraishi ............... G02F 1/0136
                                                             349/17
2003/0075676 A1   4/2003 Ruchet et al.
(Continued)

FOREIGN PATENT DOCUMENTS

WO   WO 2008/122123 A1   10/2008
WO   WO 2011/020195 A1   2/2011
WO   WO 2011/097734 A1   8/2011

OTHER PUBLICATIONS

R. Noe, "Application note 1—Error signals for polarization control", Novoptel, Nov. 7, 2012, Germany.
(Continued)

*Primary Examiner* — Leslie Pascal
(74) *Attorney, Agent, or Firm* — Helene Chotard

(57) ABSTRACT

There is provided a system and a method for determining an in-band noise parameter representative of the optical noise contribution (such as OSNR) on a polarization-multiplexed optical Signal-Under-Test (SUT) comprising two polarized phase-modulated data-carrying contributions and an optical noise contribution. For each of a multiplicity of distinct polarization-analyzer conditions, the SUT is analyzed to provide at least one polarization-analyzed component of the SUT and the polarization-analyzed component is detected with an electronic bandwidth at least ten times smaller than the symbol rate of the SUT to obtain a corresponding acquired electrical signal; for each acquired electrical signal, a value of a statistical parameter is determined from the ac component of the acquired electrical signal, thereby providing a set of statistical-parameter values corresponding to the multiplicity of distinct polarization-analyzer conditions; and, from the set of statistical-parameter values, the in-band noise parameter is mathematically determined.

26 Claims, 31 Drawing Sheets

(56) References Cited

U.S. PATENT DOCUMENTS

| | | | | |
|---|---|---|---|---|
| 2003/0175034 A1* | 9/2003 | Noe | ................ | H04B 10/07951 |
| | | | | 398/152 |
| 2005/0265728 A1* | 12/2005 | Yao | ........................ | H04J 14/06 |
| | | | | 398/152 |
| 2011/0229143 A1* | 9/2011 | Buelow | .............. | H04B 10/2569 |
| | | | | 398/116 |

OTHER PUBLICATIONS

R. Noe et al., "Crosstalk Detection Schemes for Polarization Division Multiplex Transmission", IEEE Journal of Lightwave Technology, vol. 19, No. 10, pp. 1469-1475, Oct. 2001.

M. Petersson et al., "Optical Performance Monitoring using Degree of Polarization in Presence of Polarization-Mode Dispersion", ECOC2004, Paper We1.4.2, 2004.

T. Saida et al., "In-band OSNR monitor with high-speed integrated Stokes polarimeter for polarization division multiplexed signal", Optics Express, vol. 20, No. 26, pp. B166-B170, Dec. 10, 2012.

T. Saida et al. "In-band OSNR Monitor for DP-QPSK Signal with High-speed Integrated Stokes Polarimeter", ECOC2012, Paper Th.2.A.2, 2012.

S. Szafraniec et al. "Performance Monitoring and Measurement Techniques for Coherent Optical Systems", IEEE Journal of Lightwave Technology, vol. 31, No. 4, pp. 648-663, Feb. 15, 2013.

J. H. Lee et al. "OSNR Monitoring Technique Using Polarization-Nulling Method", IEEE Photonics Technology Letters, vol. 13, No. 1, pp. 88-90, Jan. 2001.

* cited by examiner $E_x$ $E_y$

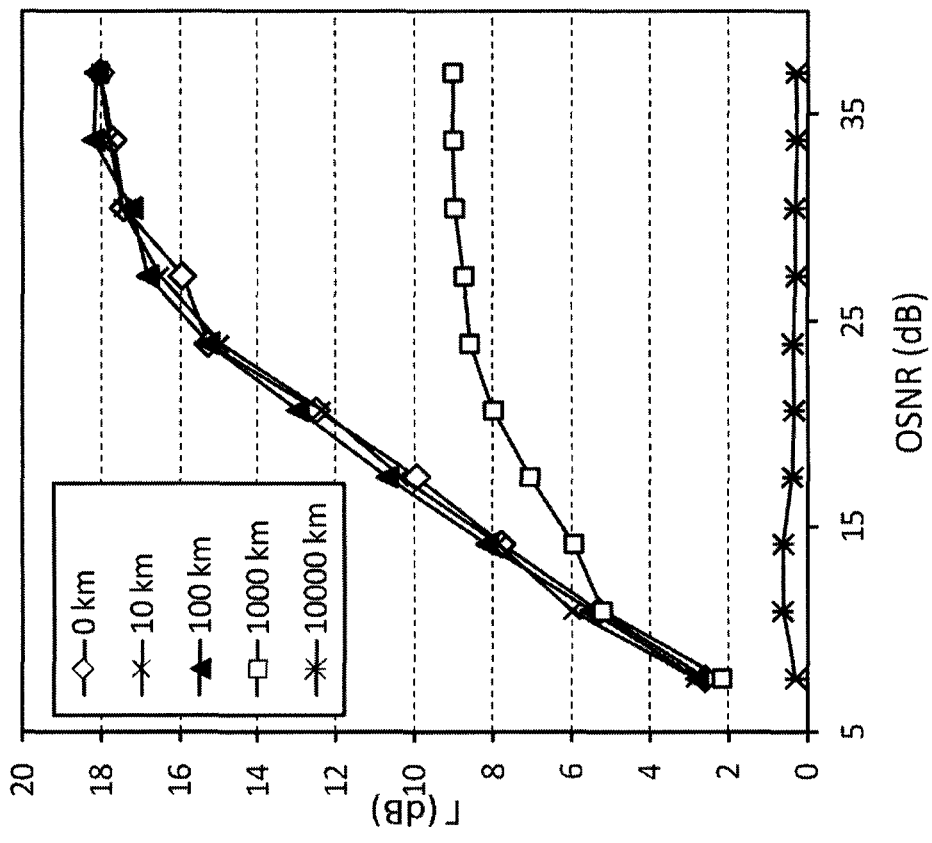
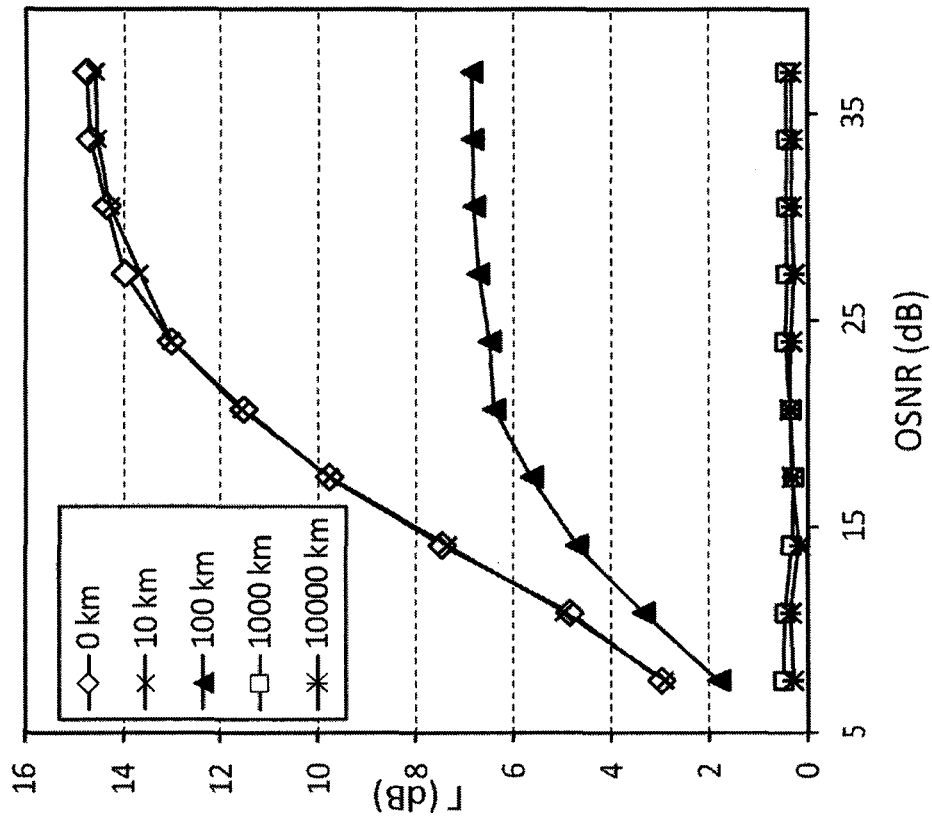
Fig. 5A
Fig. 5B

IN-BAND OSNR MEASUREMENT ON POLARIZATION-MULTIPLEXED SIGNALS

CROSS-REFERENCE TO RELATED APPLICATIONS

This application claims priority under 35USC§119(e) of U.S. provisional patent application 61/893,948 filed Oct. 22, 2013, the specification of which is hereby incorporated by reference.

TECHNICAL FIELD

The invention relates to the determination of the in-band noise in optical telecommunication applications. More specifically, the invention relates to the determination of the in-band noise on polarization-multiplexed optical signals.

BACKGROUND OF THE ART

In order to maximize the information content transmitted over a given spectral bandwidth (often measured in bits per Hz of spectral bandwidth), polarization multiplexing (referred to as "PolMux") is being increasingly used with new transmission formats. The underlying idea is that the spectral efficiency (conveniently measured in units of bits/Hz) can be effectively doubled by employing two orthogonally polarized data-carrying signals, typically having the same symbol rate, sharing the same optical signal bandwidth. Normally, these two orthogonally polarized signals are transmitted with approximately the same power, rendering the total resultant light effectively unpolarized as seen from a test-and-measurement instrument having low electronic detection bandwidth, such as is the case with most commercial Optical Spectrum Analyzers (OSA).

The Optical Signal-to-Noise Ratio (OSNR) is a direct indicator of the quality of signal carried by an optical telecommunication link. Under normal and proper operating conditions, the OSNR of an optical communication link is typically high, often in excess of 15 dB or 20 dB, or even greater. The dominant component of the noise in an optical communication link is typically unpolarized Amplified Spontaneous Emission (ASE), which is a broadband noise source contributed by the optical amplifiers in the link. In general, the ASE may be considered to be spectrally uniform across the small wavelength range spanning the optical signal bandwidth.

Some methods exist for characterizing ASE noise on optical telecommunication signals based on an in-band analysis of the optical signal. Such methods include methods referred to as "polarization-nulling" methods (see J. H. Lee et al., "OSNR Monitoring Technique Using Polarization-Nulling Method", IEEE Photonics Technology Letters, Vol. 13, No. 1, January 2001) as well as variants thereof, and the methods referred to as "differential polarization response" methods (see International Patent Application Publication WO 2008/122123 A1 to Gariepy et al.; and WO 2011/020195 A1 to He et al., both applications being commonly owned by the Applicant). However, such methods are based on the assumption that the signal is generally highly polarized, an assumption that is not valid in the case of polarization-multiplexed signals.

For the case of most polarization-multiplexed signals, the "signal", as detected on a photodiode having low bandwidth electronics for instance, appears unpolarized, and hence, these above-mentioned in-band OSNR measurement methods cannot be used to reliably provide the OSNR measurement.

In order to measure the noise level or the OSNR on polarization-multiplexed signals, system manufacturers and operators currently have to resort to turning off the signal of interest at the transmitter in order to measure the noise level and thereby determine the OSNR. A first limitation of this method is that it is highly disruptive and normally unsuitable for use in a "live" (i.e. carrying commercial payload) network, and is completely unsuitable for "monitoring" applications. Secondly, this method is predicated upon certain assumptions about the noise variations that occur when the signal-under-test is extinguished in order that its OSNR can be determined.

A method of measuring the noise level on polarization-multiplexed signals using an acquired optical spectrum trace of the signal was proposed by Gariepy et al. (see International Patent Application Publication WO 2011/097734 A1, commonly owned by the Applicant). This method is based on the knowledge of the spectral shape of the data-carrying signal contribution provided by a reference signal. Based on this knowledge, the signal contribution and the ASE noise contribution, that otherwise appear as being merged together on the optical spectrum trace, may be mathematically discriminated from one another. Knowledge of the spectral shape of the signal contribution may come from the acquisition of a reference signal taken, for example, at a different point, generally upstream, along the same optical communication link (i.e. the reference signal originates from the same optical transmitter), where either the OSNR is known or where the signal can be considered free of ASE noise. This method assumes that, within the optical signal bandwidth, the spectral shape of the signal does not significantly change as it propagates along the communication link. The signal contribution of such a reference signal is then spectrally representative of the signal contribution of the signal-under-test. The fact that this method requires that a reference signal be measured may be considered as a drawback for some applications.

The "instantaneous" degree of polarization (DOP) of the coherent sum of the orthogonally-polarized data-carrying contributions of a PolMux signal is actually very high (normally approaching 100% when impairments such as chromatic dispersion are minimal), provided that detection is carried out with a sufficiently high electronic bandwidth. Ideally, this bandwidth is of the order of the signal symbol rate ("baud"). In a recent publication, Saida et al. ("In-band OSNR Monitor for DP-QPSK Signal with High-speed Integrated Stokes Polarimeter", European Conference on Optical Communications, Paper Th.2.A.2, September 2012) describe means to characterize OSNR of a commonly-deployed PolMux modulation format (i.e. DP-QPSK) using a compact polarimeter having such a high detection bandwidth. This approach would likely not be commercially viable for use as a widely-deployed DWDM signal monitor, due to the inherently high cost of employing electronics having roughly the same bandwidth as the signal symbol rate.

There is therefore a need for a method suitable for measuring in-band noise parameters such as the OSNR of polarization-multiplexed signals, where the method may employ detection electronics having a bandwidth one or more orders of magnitude less than the signal symbol rate.

SUMMARY

It is an object of the present invention to provide a method and system for measuring in-band noise parameters that address at least one of the above-mentioned concerns.

There is provided a method for determining an in-band noise parameter (such as the OSNR) on a polarization-multiplexed optical Signal-Under-Test (SUT) comprising two polarized phase-modulated data-carrying contributions and an optical noise contribution. The method is predicated upon the fact that the distribution of States Of Polarization (SOPs) corresponding to each symbol of the Polarization-Multiplexed (PolMux) data-carrying contributions would, in the absence of noise, ideally define a relatively thin disc in the normalized Stokes-parameter space, i.e. within the Poincaré sphere. It should be noted that, even for a single-amplitude—or "single-level"—phase-modulation format such as DP-QPSK, the amplitude varies during transitions between the logical states in most practical implementations, hence rendering what theoretically would be a flat disc into one having a small non-zero thickness, i.e. a thickness much smaller than the disc radius. The effect of uncorrelated optical noise (such as ASE) is to further deform the aforementioned thin disc into a lens-shaped distribution or bulged "disc", whose thickness is related to the level of such noise. Advantageously, this method assumes that the duration of a single acquisition is much longer than the symbol period of the SUT. Further, it assumes that the SOP of each of the two polarized data-carrying contributions comprised in the SUT does not vary over the duration of a single acquisition, this duration being shorter than the time period over which the SOP of the two polarized data-carrying contributions might vary significantly.

Prior art methods exist that are also based on characterization of this "lens" in the Poincaré sphere representation (see Saida et al. "In-band OSNR Monitor for DP-QPSK Signal with High-speed Integrated Stokes Polarimeter", European Conference on Optical Communications, Paper Th.2.A.2, September 2012). However, such prior art methods employ high-speed "real-time" detection (of the order of the signal symbol rate) in order to temporally resolve the SOP changes of the phase-modulated polarization-multiplexed SUT and that of the optical noise. However, it was realized that not only is this not necessary to evaluate the in-band optical noise but that it is also detrimental in certain aspects. More specifically, the approach of Saida et al. does not address the issue as to how to measure OSNR in the presence of Chromatic Dispersion (CD). As shown herein, CD may induce significant errors in the OSNR determination, especially for high OSNR values or large CD values. The provided method therefore employs relatively low-bandwidth detection to polarization analyze the SUT. The acquired information provided by these low-bandwidth electrical signals is sufficient to then mathematically estimate the in-band optical noise, assuming that the SUT modulation format (e.g. NRZ-DP-QPSK) is known. (However, knowledge of the exact signal symbol rate, e.g. 28 GBaud vs 32 GBaud, is normally not critical.) Aside from reducing the cost and thermal dissipation of the electronic components, data acquired with this lower detection bandwidth advantageously permit the in-band optical noise to be reliably measured even in the presence of high CD. Another beneficial effect of the lower electronic bandwidth is that the ratio of measured lens thickness to measured lens diameter is usually smaller than that obtained with a high electronic bandwidth (particularly when the transitions are fast, as well as for modulation schemes suitable for spectrally densely-packed "Nyquist WDM" transmission or schemes using "raised-cosine" filtering). Hence, a low-bandwidth approach allows measurement of a given OSNR value with lower uncertainty or measurement of a higher OSNR with the same level of uncertainty (or some combination thereof) than a high-bandwidth approach.

In accordance with one aspect, there is provided a method for determining an in-band noise parameter (such as the OSNR) on a polarization-multiplexed optical Signal-Under-Test (SUT) comprising two polarized phase-modulated data-carrying contributions and an optical noise contribution. For each of a multiplicity of distinct polarization-analyzer conditions, the SUT is analyzed to provide at least one polarization-analyzed component of the SUT and the polarization-analyzed component is detected with an electronic bandwidth at least ten times smaller than the symbol rate of the SUT to obtain a corresponding acquired electrical signal; for each acquired electrical signal, a value of a statistical parameter is determined from the ac component of the acquired electrical signal, thereby providing a set of statistical-parameter values corresponding to the multiplicity of distinct polarization-analyzer conditions; and, from the set of statistical-parameter values, the in-band noise parameter representative of the optical noise contribution is mathematically determined.

In accordance with another aspect, there is provided a system for determining an in-band noise parameter on a polarization-multiplexed optical Signal-Under-Test (SUT) comprising two polarized phase-modulated data-carrying contributions and an optical noise contribution. The system comprises: a polarization-optics arrangement for analyzing the SUT according to each of a multiplicity of distinct polarization-analyzer conditions to provide at least one polarization-analyzed component of the SUT; at least one optical detector to obtain a corresponding electrical signal, the optical detector having an electronic bandwidth at least ten times smaller than the symbol rate of the SUT; a true-rms converter receiving the electrical signal for determining a value of a statistical parameter from the ac component of the electrical signal, thereby providing a set of statistical-parameter values corresponding to the multiplicity of distinct polarization-analyzer conditions; and a noise calculator receiving the set of statistical-parameter values and configured for mathematically determining therefrom the in-band noise parameter representative of the optical noise contribution.

In most embodiments of the herein described methods and systems, the in-band noise parameter that is being determined is the OSNR, conventionally but not necessarily defined as the optical power of the data-carrying signal divided by the optical-noise power within a 0.1-nm optical bandwidth. However, other in-band noise parameters may be determined instead or in addition to the OSNR. Such other in-band noise parameters include the in-band noise level, the Bit Error Rate (BER), the electrical signal-to-noise ratio, etc.

In accordance with yet another aspect, there is provided a method for determining a polarization-dependent loss parameter on a polarization-multiplexed optical Signal-Under-Test (SUT) comprising two polarized phase-modulated data-carrying contributions. The method comprises: for each of a multiplicity of distinct polarization-analyzer conditions, analyzing the SUT to provide at least one polarization-analyzed component of the SUT and detecting the polarization-analyzed component to obtain a corresponding acquired electrical signal; for each acquired electrical signal, determining a value of the dc component of the acquired electrical signal, thereby providing a set of dc component values corresponding to the multiplicity of distinct polarization-analyzer conditions; and mathematically determining, from the set of dc component values, the polarization-dependent loss parameter.

For example, the multiplicity of polarization-analyzer conditions may comprise three conditions that are mutually orthogonal in Stokes-parameter space, such as usually is the case for a polarimeter, thereby providing a set of three dc component values corresponding to Stokes-parameter values.

BRIEF DESCRIPTION OF THE DRAWINGS

Further features and exemplary advantages of the present invention will become apparent to the skilled person from the following detailed description, taken in conjunction with the appended drawings, in which:

FIG. 2A, FIG. 2B and FIG. 2C are referred to together as FIG. 2, wherein FIGS. 2A and 2B are a constellation diagrams of $E_x$ and $E_y$ PolMux carrier contributions respectively, and FIG. 2C is a corresponding Poincaré sphere representation illustrating the mapping of their instantaneous coherent sums;

FIG. 5A and FIG. 5B are referred to together as FIG. 5 and are graphs of Γ as a function of the OSNR corresponding to different fiber lengths, respectively corresponding to a 1-GHz electronic detection bandwidth (FIG. 5A) and to a 100-MHz electronic detection bandwidth (FIG. 5B);

FIG. 6A and FIG. 6B are referred to together as FIG. 6 wherein FIG. 6A is a graph showing simulation results of the ratio Γ as a function of OSNR in presence of PMD (γ=1/2) for a 28-GBd NRZ-DP-QPSK signal, and FIG. 6B is a graph showing theoretical curves modeling the ratio Γ as a function of OSNR;

FIG. 7A and FIG. 7B are referred to together as FIG. 7 wherein FIG. 7A is a graph showing simulation results illustrating potential underestimation of OSNR as a function of DGD for a 28-GBd NRZ-DP-QPSK signal, and FIG. 7B is a graph showing simulation results when using a correction procedure to compensate for DGD;

DETAILED DESCRIPTION

Figure 1:
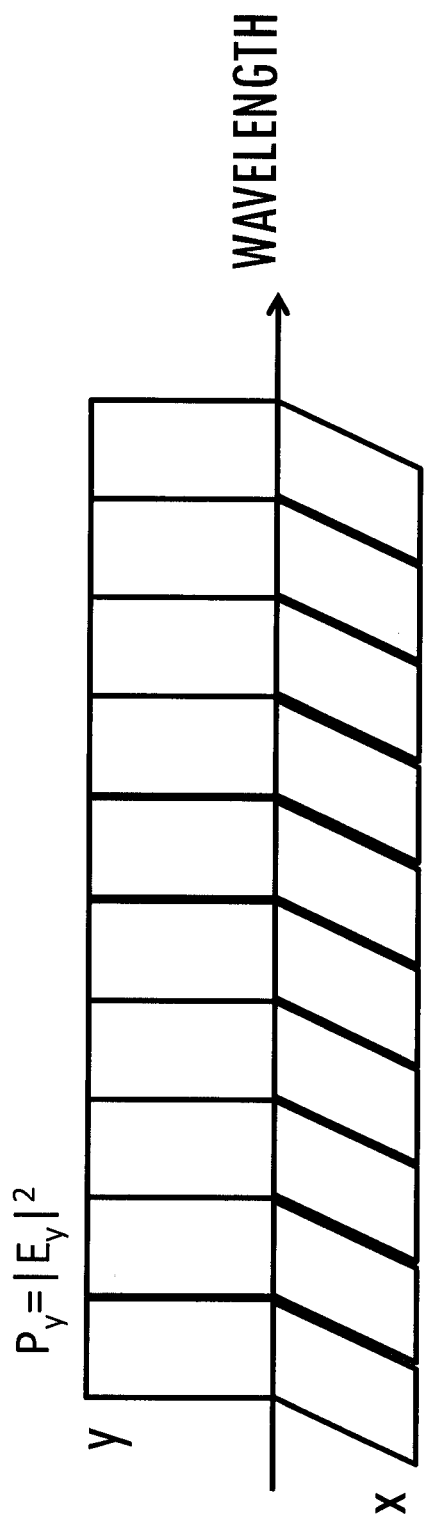
FIG. 1 is a schematic illustrating a Polarization-Multiplexed (PolMux) optical signal comprising two orthogonally-polarized data-carrying signal contributions.

Referring to FIG. 1, a PolMux signal normally comprises two polarized data-carrying contributions that are mutually-orthogonal, i.e. signals whose respective Stokes parameters differ only by a polarity (i.e. + or −). Conceptually and without loss of generality, these two signals may be considered to be respectively linearly aligned with arbitrary x and y axes, with corresponding electrical fields $E_x$ and $E_y$. The basis of the Stokes coordinates may be rotated so that, for instance, the optical-carrier electrical field of the first data-carrying signal $E_x$ is aligned with $S_1$, and that of the optical-carrier electrical field of the second data-carrying signal $E_y$ is aligned with $-S_1$, as illustrated in FIG. 1. Apart from the data-carrying signal contributions, the Signal-Under-Test (SUT) generally comprises an optical noise contribution which includes all other sources of optical power within the optical channel. The optical noise contribution typically arises mostly from the Amplified Spontaneous Emission (ASE) noise of the optical amplifiers in the optical transmission system.

In the description of embodiments of the method, reference is made to a Signal-Under-Test (SUT) that is in accordance with the Dual-Polarization Quadrature Phase-Shift Keying (DP-QPSK) modulation format, including its specific implementations (e.g. RZ-DP-QPSK, NRZ-DP-QPSK, "Nyquist-WDM"-shaped, "raised-cosine-filtered", etc.). It should however be understood that the method described herein applies to any implementations of DP-QPSK as well as to other single-amplitude (i.e. not amplitude modulated) Polarization-Multiplexing (PolMux) modulation formats such as DP-8PSK for example, and that the embodiments described herein may be adapted to such other formats (it should be appreciated that DP-QPSK, PM-QPSK, PDM-QPSK, PolMux-QPSK, and CP-QPSK are equivalent nomenclatures often used in the literature designating the same optical modulation format as defined by the Optical Internetworking Forum (OIF)). In the case of such phase-modulation PolMux formats, the data-carrying contributions comprise two polarized phase-modulated contributions.

It should be further noted that, for simplicity of the description herein, the orthogonally-polarized contributions are conceptually supposed to be linearly polarized even though it is understood that in practice this is not generally the case. In keeping with accepted convention, the nomenclature $E_x$ and $E_y$ in this context refers, respectively, to the electric fields of the orthogonally-polarized contributions of the PolMux signal comprising different data payloads, which, although normally not necessarily linearly polarized, could be rendered linearly polarized if the signal traverses a suitably-adjusted polarization controller.

Figure 2C:
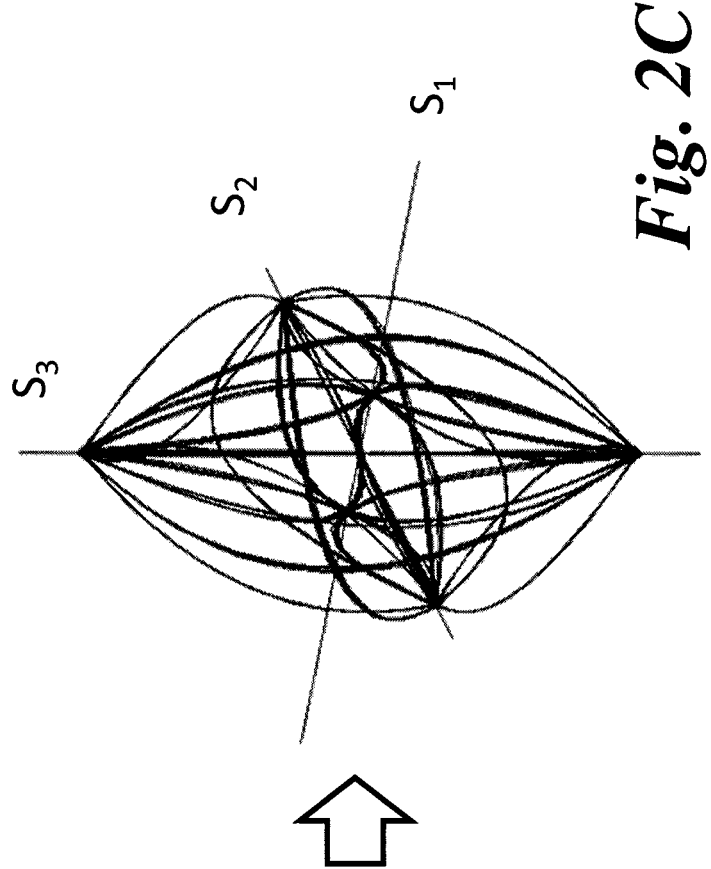
Figure 2A:
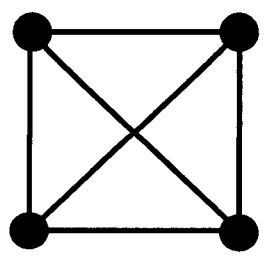
Figure 2B:
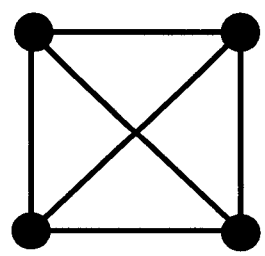

The two orthogonally-polarized data-carrying contributions of the signal-under-test are each QPSK modulated to carry in-phase (I) and quadrature-phase (Q) signal tributaries. A phase constellation diagram representation is commonly used in the art to depict, for each orthogonally-polarized carrier contribution, the constellation points (i.e. the logical states) and the "transitions" therebetween. FIGS. 2A and 2B shows respectively constellation diagrams of $E_x$ and $E_y$ orthogonally-polarized carrier contributions and FIG. 2C shows a representation on the Poincaré sphere of all the possible coherent instantaneous combinations of these constellation points representing the sum of the x-aligned and y-aligned constellation points (or "modulation states"). As is already known in the art (see for example: Szafraniec et al., "Performance Monitoring and Measurement Techniques for Coherent Optical Systems", J Lightw. Tech. vol. 31(4) pp. 648-663, 2013), the multiplicity of these coherently-summed modulation states falls within or be distributed on or about the surface of a lens-shaped disc (referred to herein after as a "lens") within the Poincaré sphere having its axis aligned along the $S_1$ direction and having a non-zero thickness, as depicted in FIG. 2C. This result is true provided that the state of polarization of $E_x$ and $E_y$ does not vary significantly during a suitable acquisition time. Transitions between modulation states, captured during the brief sampling time, generally appear as points on the surface of or within a volume defined by the lens, so that this lens nominally has a non-zero thickness. To the extent that uncorrelated noise (e.g. ASE noise) is superposed on the data-carrying signal, it will increase the apparent thickness of the lens, and will render the lens somewhat less well defined, as many acquired points will fall outside of the lens volume. The ratio (and distribution) of these "errant" points to those on and within the lens underlies the prior art approaches of Szafraniec et al (loc cit) and Saida et al (loc cit). Szafraniec et al use an Optical Modulation Analyzer (OMA), comprising a coherent optical local oscillator and intradyne (i.e. IF-recovery-based) demodulation to measure the quadrature-modulated $E_x$ and $E_y$, and subsequently calculate the Stokes parameters therefrom. Saida et al directly measure the Stokes parameters using a "traditional" but high-speed polarimeter design. It is important to note that, in both of the aforecited prior art, polarimetric data were acquired with a detection bandwidth approximately equal to the 32-GBaud signal spectral width (in typical coherent receivers, the electronic bandwidth is usually 0.5 to 1 times the signal symbol rate). With such a high acquisition bandwidth, many polarimetric data points corresponding to many different symbols may be acquired over a time interval much shorter than that over which the input SOP of a realistic telecom SUT might vary (e.g. due to vibrations and movement of the fiber along the optical link), and hence, a "lens" normally would be readily resolvable.

Assuming that the normal to the lens is aligned with $S_1$, it is useful to define a ratio $\Gamma$ (also referred to herein as a thickness parameter) from the Stokes parameters measured with the polarimeter:

$$\Gamma = \frac{\langle |S_2|^2 \rangle + \langle |S_3|^2 \rangle}{2\langle |S_1|^2 \rangle} \quad (1)$$

where the brackets ( ) represent the average value. Here, $\Gamma$ can be interpreted as the variance of the lens diameter, divided by the variance of its thickness.

If the constituent polarized data-carrying contributions comprising the PolMux signal-under-test have an arbitrary (e.g. random) SOP, the lens normal $\hat{n}_1$ and the two orthogonal vectors that lie in the plane of the lens, $\hat{n}_2$ and $\hat{n}_3$ may be found via singular value decomposition (SVD), a well-known algorithm in signal processing. Then $\Gamma$ may be expressed as:

$$\Gamma = \frac{\langle |S \cdot \hat{n}_2|^2 \rangle + \langle |S \cdot \hat{n}_3|^2 \rangle}{2\langle |S \cdot \hat{n}_1|^2 \rangle} \quad (2)$$

One can show that the ratio $\Gamma$ as a function of OSNR may be cast as:

$$\Gamma = \frac{k_{2,max}OSNR^2 + k_1 OSNR + k_0}{k_{2,min}OSNR^2 + k_1 OSNR + k_0} \quad (3)$$

where the parameters $k_0$, $k_1$, $k_{2,max}$, and $k_{2,min}$ are found empirically via a calibration process for the modulation format of interest, since the parameters tend to vary somewhat according to modulation-format-related factors such as signal rise time, etc., which may be important for measurement of high OSNR values. For instance, such a calibration process may comprise adding, under controlled conditions (e.g. at the "factory"), a known ASE noise density (and hence OSNR) to a DP-QPSK transmitter of known power, and then measuring $\Gamma$ as a function of OSNR. The parameters may then be determined from a least-square fit to the $\Gamma$(OSNR) result. Other calibration approaches may also be envisaged.

Figure 3:
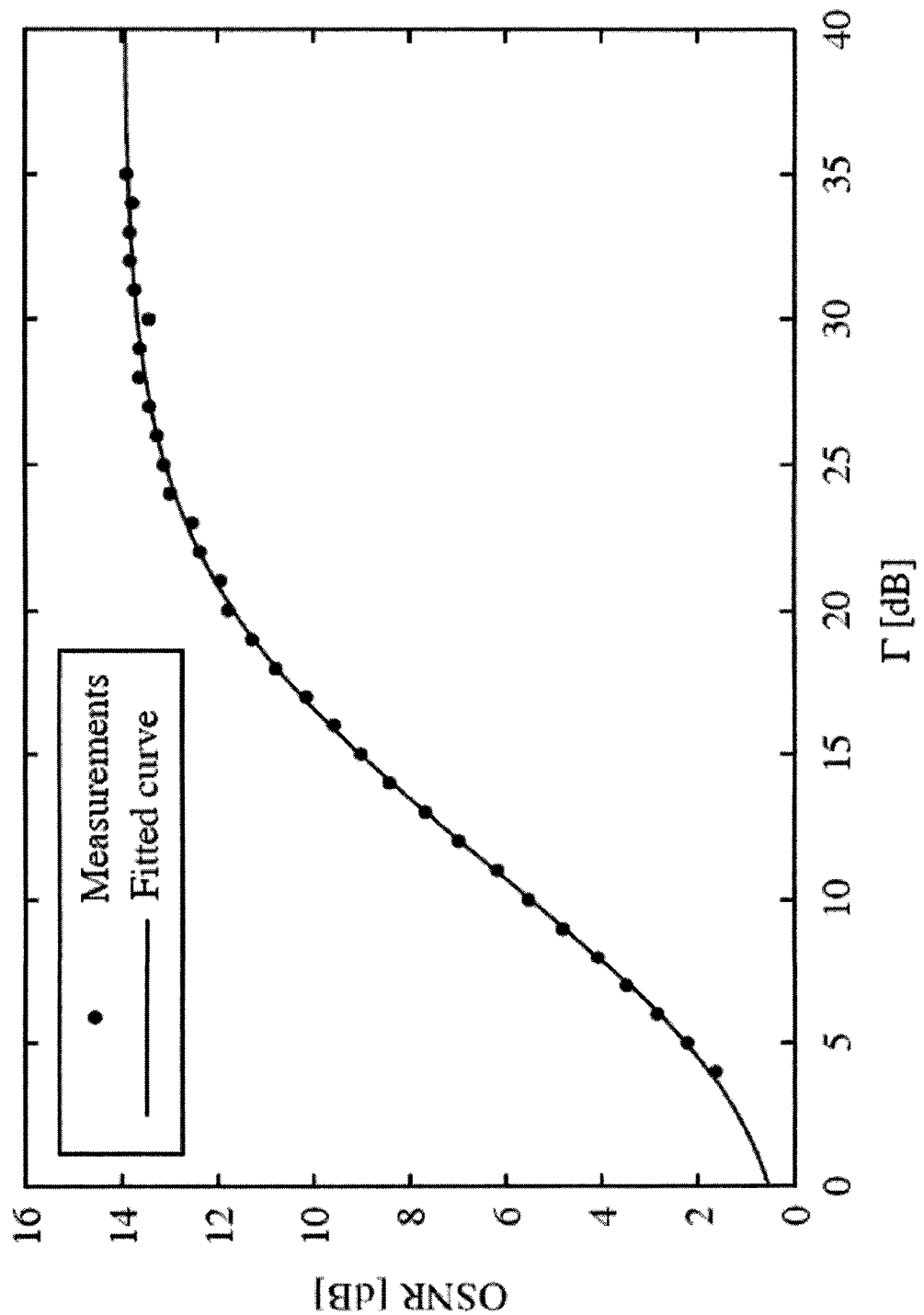
FIG. 3 is a graph showing experimentally measured Γ ratio versus OSNR together with a theoretical fitted curve.

As an example, FIG. 3 illustrates the result of such a calibration procedure for a particular NRZ-DP-QPSK transmitter. The ratio $\Gamma$ was measured as a function of OSNR using the embodiment of the system shown in FIG. 12, to be described in further detail hereinbelow. Using a least-squares-fit calibration procedure, the calibration parameters were found to be $k_0=113$, $k_1=72.8$, $k_{2,max}=24.8$, and $k_{2,min}=1$. As is apparent from FIG. 3, the agreement between Equation (3) and the measured points is excellent. For large OSNR, one observes that the ratio $\Gamma$ approaches $k_{2,max}/k_{2,min}=24.8$ (=13.9 dB), and for low OSNR it approaches 1.

Equation (3) may be rearranged to provide a more practically useful equation for OSNR as a function of the ratio $\Gamma$:

$$OSNR = \frac{-k_1(1-\Gamma) \pm \sqrt{k_1^2(1-\Gamma)^2 - 4(k_{2,max} - \Gamma k_{2,min})(1-\Gamma)k_0}}{2(k_{2,max} - \Gamma k_{2,min})} \quad (4)$$

Figure 4:
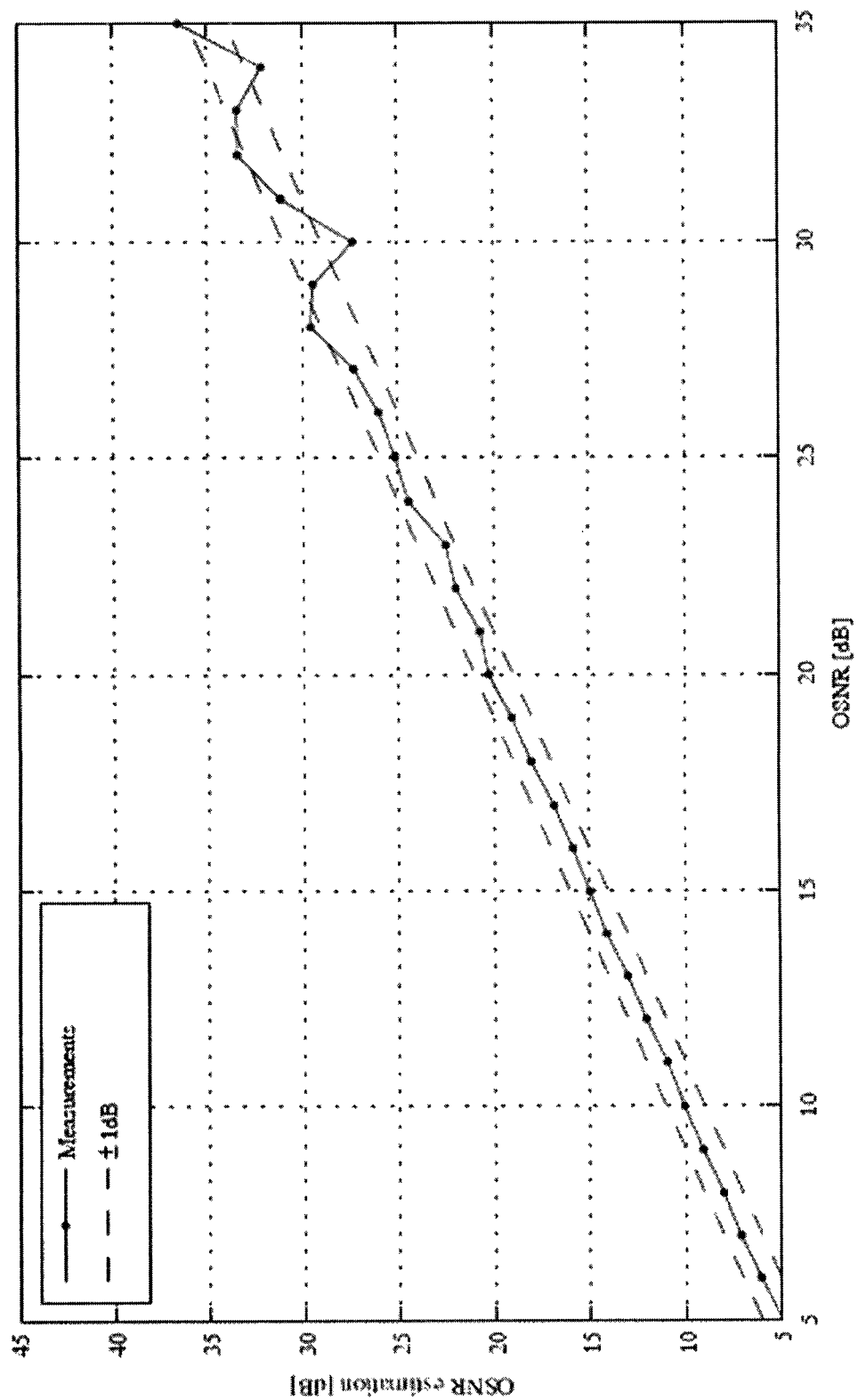
FIG. 4 is a graph showing the relationship between the OSNR determined by embodiments of the present invention and the "true" OSNR.

FIG. 4 presents, on the ordinate, the OSNR as determined via Eq. (4) with an averaging over 10 individual measurements, and, on the abscissa, the "true" OSNR determined on an optical test bed employing injection of known levels of ASE. This figure highlights that the uncertainty of the estimated OSNR increases for higher OSNR values, but likely remains within tolerable limits for most applications at least up to 25 dB.

It should be appreciated that equations other than equations (3) and (4) may also be employed to relate the thickness of the lens in the Stokes-parameter representation to the OSNR of the signal-under-test. For example, as defined and demonstrated in Saida (toc cit), who polarimetrically resolved the individual symbols of the signal, the standard deviation a of the thickness may also be related to $\alpha = P_n/P_S$, where $P_n$ and $P_s$ are respectively noise and signal powers, as follows:

$$\sigma \approx \sqrt{(1-\alpha)^2 \sigma_0^2 + \frac{\gamma^2 \alpha^2}{2} + \alpha(1-\alpha)\gamma\varepsilon}, \quad (4a)$$

where $\sigma_0$ is the standard deviation of the lens without uncorrelated optical noise and $\gamma$ and $\epsilon$ are parameters corresponding to the degree of polarization of the signal and noise respectively (note that the parameter y employed by Saida et al is different than the $\gamma$ representing power splitting ratio used elsewhere within the present specification).

It should also be noted that if most if not all currently-available commercial PolMux transmitters apportion the output light of a single high-coherence laser in a polarization-diverse manner to provide the two optical carriers of the respective two mutually-orthogonal polarized signal contributions. However, embodiments of the methods and systems described herein would also be applicable to SUTs for which distinct but closely-spaced optical carriers (e.g. from two different lasers) are employed, mutually spaced by small optical frequency difference $\Delta f$. In such a case, the lens rotates with frequency $\Delta f$ about its normal. Nevertheless, the methods and systems described herein may also be suitably applied to such cases.

The relationship presented in Eq. (3) assumes that the only variable affecting $\Gamma$ is OSNR. In the absence of substantial chromatic dispersion (CD) and polarization mode dispersion (PMD) (to be discussed further hereinbelow), this is normally an excellent approximation for low OSNR values, i.e. signals having a high level of superposed ASE. However, Eq. (3) becomes less applicable at high OSNR values if the SUT fields $E_x$ and $E_y$ deviate from perfect orthogonality or if their respective average powers are significantly different. Roughly speaking, a 1-dB power imbalance between the x- and y-polarized signal contributions corresponds to a 1-dB underestimate of the actual OSNR at 30-dB OSNR, but leads to a negligible underestimate at 20-dB OSNR. However, in practice, any power imbalance would likely be much less than 1 dB, and hence one does not expect it to contribute any significant error on realistic OSNR estimates.

Other "transmitter"-related sources of distortion that may affect OSNR determination include quadrature error, IQ gain imbalance, PDL, IQ skew, XY skew. "Transmission"-related distortions (i.e. during propagation) that can affect the ratio $\Gamma$ include PMD, CD, non-linear effects, PDL. In practice, "transmission"-related distortions are usually more significant than "transmitter"-related distortions, since telecom-grade transmitters are well designed (low XY- and IQ-skew, low $P_x/P_y$ power imbalance) and bias regulated (low quadrature error, low IQ gain imbalance) for optimum performance. For most of these "transmission"-related distortion mechanisms, it is mainly the maximum value of the ratio $\Gamma$ that is decreased by such an imperfection (via an increasing denominator in Eq. (3), i.e. $k_{2,min}$ becomes larger), which limits the useful measurement range (since the $\Gamma$ vs OSNR curve becomes progressively more flattened at high OSNR for higher values of the $k_{2,min}$ parameter).

Chromatic dispersion (CD) is a "transmission" impairment which can significantly limit the ability to characterize optical noise on a PolMux signal. High values of CD severely distort the aforementioned "lens". Saida et al (loc cit) do not present means to correct for CD in the OSNR estimation. Szafraniec et al (loc cit) overcome this problem using the "real-time" intradyne detection capabilities of their OMA, followed by advanced post-processing. Consequently, such post-processing CD compensation would not be possible if the electronic bandwidth of the "front-end" detection electronics were to be one or more orders of magnitude lower than the SUT symbol rate. Moreover, their instrument is inherently very complicated and expensive, and would be unsuitable as a low-cost OSNR monitor or portable Test & Measurement instrument. On the other hand, aspects of the present invention which employs a much lower electronic detection bandwidth, advantageously permit a noise-related parameter such as OSNR to be reliably measured even in the presence of high values of CD. In other words, by employing a much lower electronic detection bandwidth, the ratio Γ is little changed in the presence of CD.

FIG. 5 illustrates this behavior for a computationally simulated 28-GBaud NRZ-DP-QPSK signal-under-test. The ratio Γ is plotted as a function of OSNR for different lengths of standard (G.652) single-mode fiber having a dispersion coefficient of 17 ps/nm/km. For an electronic detection bandwidth of 1 GHz, the maximum fiber length for which CD distortion is tolerable is of the order of 10 km (i.e. CD approximately 170 ps/nm). For a reduced bandwidth of 100 MHz, this maximum length increases to approximately 100 km (CD approximately 1700 ps/nm). Extrapolation of these results to a 10-MHz bandwidth indicates that the CD tolerance would reach 17 000 ps/nm. The choice of electronic bandwidth is determined principally by the temporal rate of change of the SOP of the signal-under-test. For a highly stable link (e.g. a submarine link, or certain buried terrestrial fibers), a 3-dB electronic bandwidth of 10 MHz or less might be employed. On the other hand, for a link susceptible to environmental perturbations (e.g. comprising long "aerial" cables), and/or for links having a large value of polarization mode dispersion (PMD), the detection bandwidth may have to be higher. Nonetheless, for almost all practical applications, the electronic bandwidth is significantly less than the bandwidth required for temporally resolving a high-bandwidth (e.g. 100 Gb/s) DP-QPSK signal. It can therefore be found that electronic detection bandwidths having values between one over a hundred thousand to one over a hundred (1/100000 to 1/100) of the symbol rate result in improved CD tolerance and that electronic detection bandwidths having values between one over ten thousand to one over a thousand (1/10000 et 1/1000) of the symbol rate would be suitable for highly stable link while at the same time resulting in a CD tolerance that would be suitable for most applications of PolMux transmission.

Polarization mode dispersion (PMD) is an additional "transmission"-related phenomenon that can impair reliable OSNR measurement of PolMux signals. At a given wavelength and at a given time, PMD is manifest as differential group delay (DGD). The DGD, also denoted as Δτ, is the difference in propagation time between light propagating along the "fast" fiber axis (defined at a particular wavelength at a particular time) and the corresponding "slow" fiber axis. Unlike CD, the measurement method is not rendered less susceptible to DGD by simply reducing the electronic detection bandwidth.

It can be shown that the effect of DGD is to decrease the ratio Γ. This is apparent from FIG. 6A, which shows simulation results of the ratio Γ as a function of OSNR in presence of PMD (γ=1/2) for a 28-GBd NRZ-DP-QPSK signal.

Figures 6A, 6B:
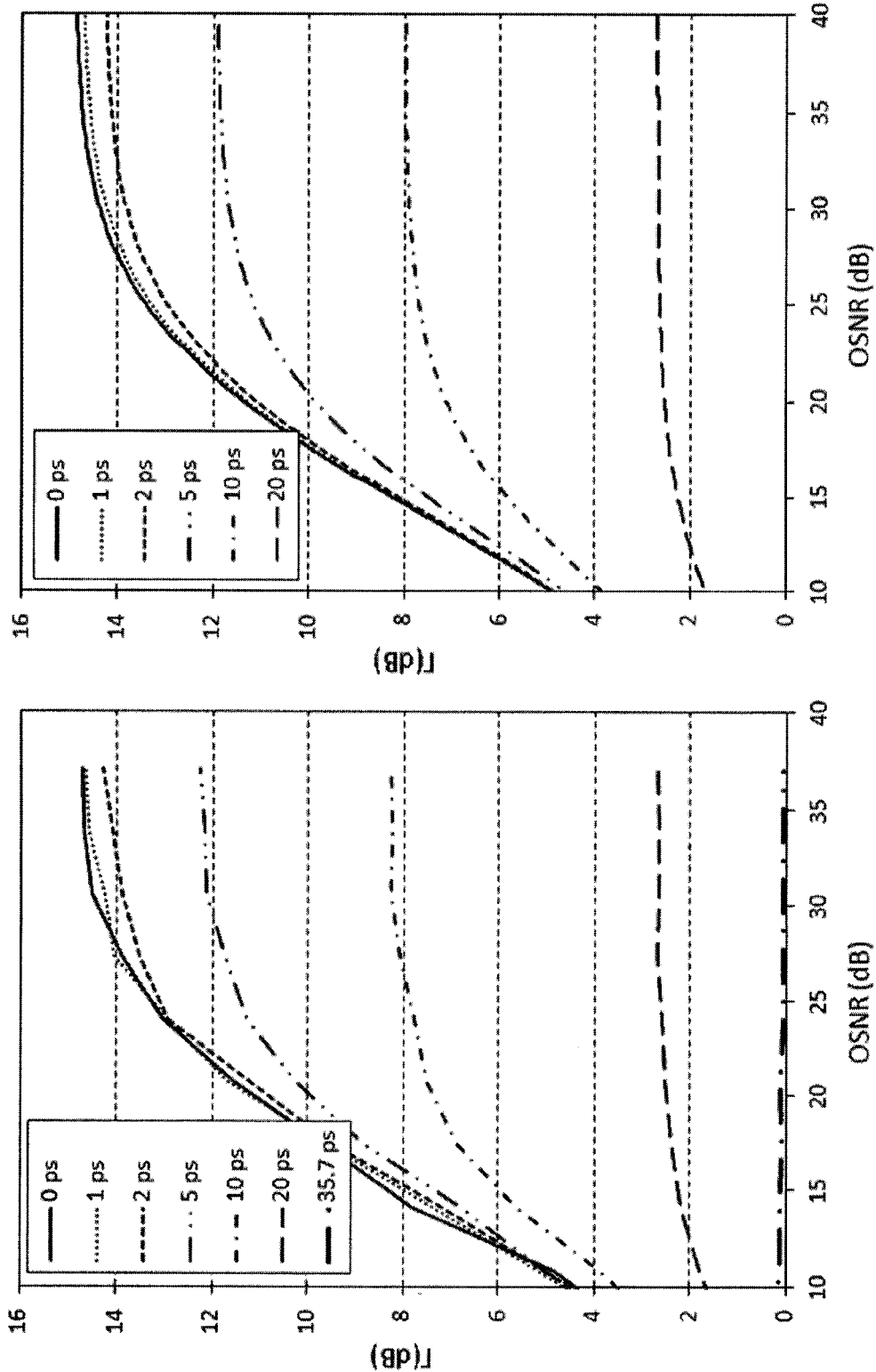

FIG. 6B illustrates the following modelling of the ratio Γ as a function of OSNR, which corresponds to the simulation of FIG. 6A. In order to perform such modeling, it is convenient to define a power splitting ratio, γ, between that portion of the optical power in one of the two polarized data-carrying contributions that is aligned with the "fast" axis to that aligned with the "slow" axis. Now, in the presence of DGD, Δτ, the coefficient $k_{2,min}$ in the denominator of Eq. (3) (for the case of no DGD) is replaced by a modified coefficient $k'_{2,min} = k_{2,min} + k_3 \gamma(1-\gamma)\Delta\tau^2 B^2$ where B is the symbol rate of the input SUT (i.e. approximately its optical bandwidth) and the additional coefficient $k_3$ can be obtained by simulations or in a calibration procedure. For instance, this calibration may involve equally splitting the two orthogonal fields of a DP-QPSK transmitted signal, i.e. γ=1/2, between the two axes in a PMD emulator, and then the ratio Γ is measured as a function of DGD. The ratio Γ may thus now be expressed as:

$$\Gamma = \frac{k_{2,max}OSNR^2 + k_1 OSNR + k_0}{(k_{2,min} + k_3\gamma(\gamma-1)\Delta\tau^2 B^2)OSNR^2 + k_1 OSNR + k_0} \approx \frac{k_{2,max}OSNR^2 + k_1}{(k_{2,min} + k_3\gamma(\gamma-1)\Delta\tau^2 B^2)OSNR^2 + k_1} \quad (5)$$

In the case of FIGS. 6A and 6B, the parameter values are $k_1=135$, $k_{2,max}=31$, $k_{2,min}=1$, $k_3=160$.

For "single-polarization" data-carrying signals (i.e. non-PolMux signals), there are known methods, not requiring very high electronic detection bandwidth, to compensate the effect of DGD on the OSNR estimation. An example of such an approach for a single-polarization signal has been presented by Petersson et al ("Optical performance monitoring using degree of polarization in presence of PMD", European Conference on Optical Communication 2004, Stockholm, Paper We1.4.2). However, this method is not applicable to PolMux signals and is not be compatible with the requirement of simultaneously detecting all or most of the SUT spectral width (and not just a small slice thereof) for the OSNR estimation, and of employing a detection bandwidth much less than the SUT symbol rate.

The expression for OSNR as a function of the ratio Γ in the absence of PMD may be rewritten as (by inverting Eq. (3) and neglecting $k_0$, which is valid for OSNR>10 dB):

$$OSNR = \frac{k_1(\Gamma - 1)}{k_{2,max} - \Gamma k_{2,min}} \quad (6a)$$

In the same way, by neglecting $k_0$ and inverting Eq. (5), the effect of PMD on the estimated OSNR may be described by:

$$OSNR = \frac{k_1(\Gamma - 1)}{k_{2,max} - \Gamma(k_{2,min} + k_3\gamma(\gamma-1)\Delta\tau^2 B^2)} \quad (6b)$$

Figure 7A:
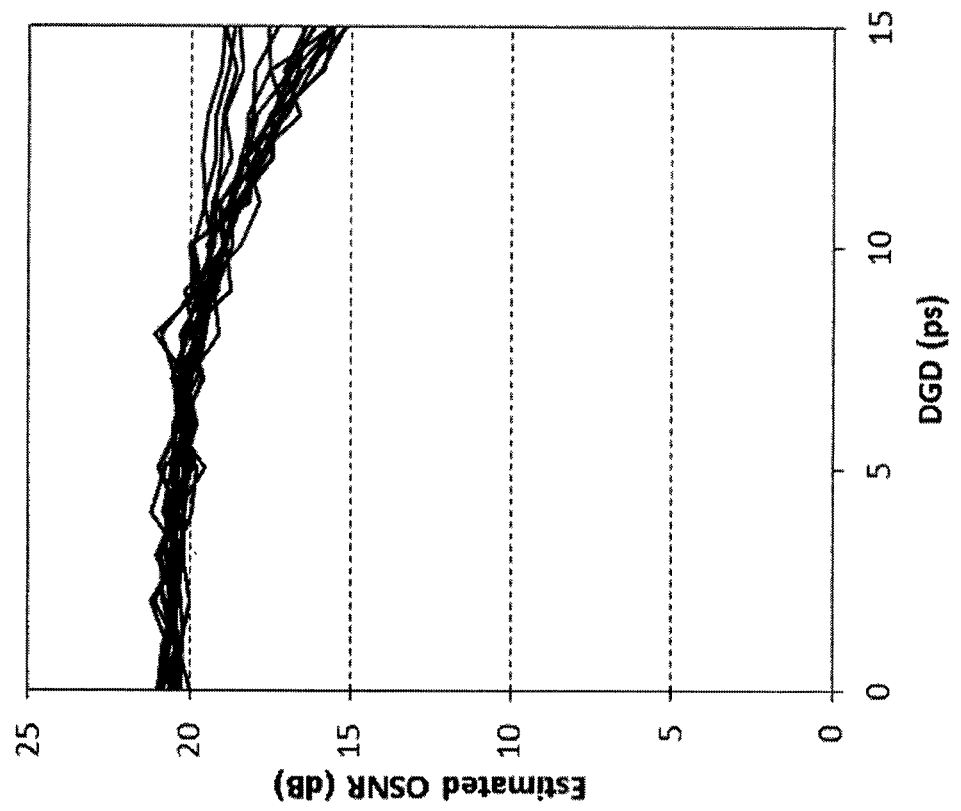
Figure 7B:
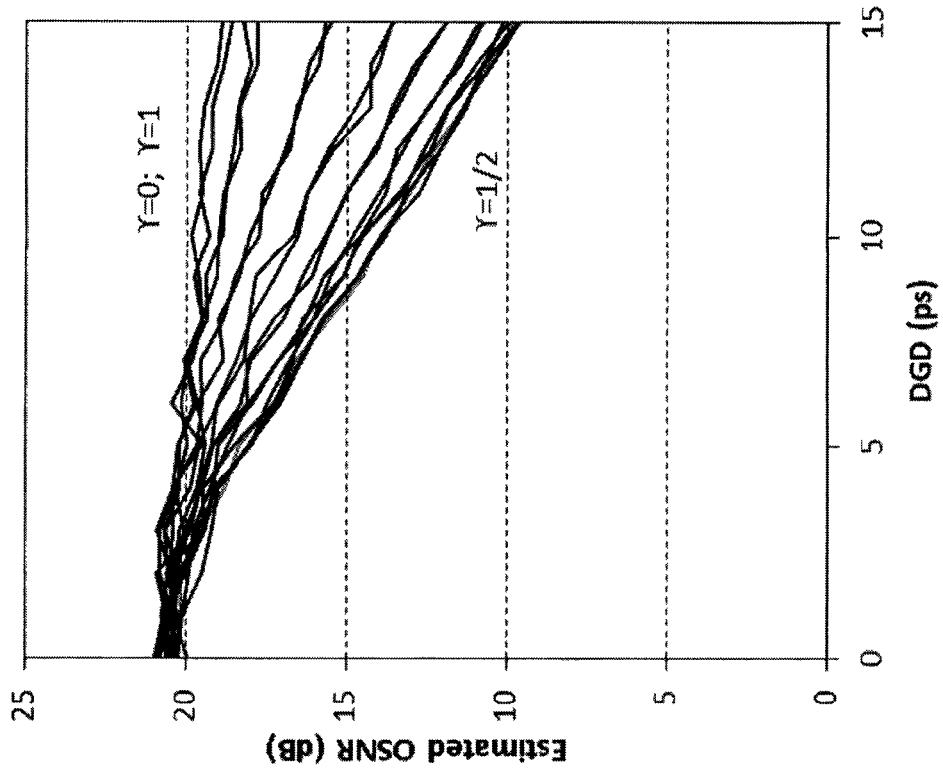

FIG. 7A shows the effect of DGD on the estimated OSNR, if no correction is applied, i.e. if Eq. (6a) is used. As shown in FIG. 7B, the effect of DGD can be corrected for by employing Eq. (6b) instead. It can be seen in FIG. 7A that, for a given DGD value, the underestimation of the OSNR is most pronounced when the optical power of each of the two polarized signal contributions (e.g. $E_x$ and $E_y$ in FIG. 1) comprising the PolMux signal is evenly divided between the slow and fast axes, i.e. the power ratio γ=1/2.

Now, in one embodiment of the present invention, the factor $\gamma(1-\gamma)\Delta\tau^2$ may be derived from the measured data according to the following steps:

SOP measurements are conducted for two spectral slices of the signal spectrum, corresponding to the "red" ($\omega_1$) and "blue" ($\omega_2$) wings of the signal separated by optical-frequency difference Δf. The spectral slices may be obtained using a polarization-independent tunable optical filter for example. For each spectral slice, a lens-shaped distribution is obtained in Stokes-parameter space.

Then, the lens normal $\hat{n}_{\omega 1}$, $\hat{n}_{\omega 2}$ is found for each of the two spectral slices. The lens normals $\hat{n}_{\omega 1}$, $\hat{n}\omega 2$ may be retrieved by employing a singular-value decomposition (SVD) algorithm for example.

The factor $\gamma(1-\gamma)\Delta\tau^2$ is then approximated from the angle between the lens normals $\hat{n}_{\omega 1}$, $\hat{n}\omega 2$ using the following equation which holds for $\Delta\tau \ll 1/\Delta f$.

$$\gamma(1-\gamma)\Delta\tau^2 \approx \left(\frac{1}{2}\frac{1}{\Delta\omega}\arccos(\hat{n}_{\omega 1}\cdot\hat{n}_{\omega 2})\right)^2 \quad (7)$$

Of course, other methods to determine the factor $\gamma(1-\gamma)\Delta\tau^2$ may also be envisaged.

The above-cited prior art has shown that the OSNR may be estimated by polarimetrically resolving the lens in the Poincaré sphere (i.e. in Stokes coordinates, with a diameter normalized to the total SUT power) with Nyquist sampling (i.e. temporally resolving a contiguous sequence of individual symbols). Such an estimation utilizes the fact that the diameter of the lens is more dependent upon the (modulated) signal power then the thickness of the lens, whereas both the thickness of the lens and the diameter of the lens have approximately the same dependence on the noise. These different proportionalities have been exploited by Saida et al (loc cit) to provide an OSNR estimation. Aspects of the present invention are based upon the realization that the Nyquist sampling underpinning the approach of Saida et al is not necessary. Aside from reducing the cost and thermal dissipation of the electronic components, data acquired with this lower detection bandwidth is effectively averaged over a time interval much longer than the symbol period of a high-speed signal. Over such a long averaging period, the measured variances in both the signal and noise are reduced, but they are still very measurable.

In embodiments of the invention, the data-carrying portion of the PolMux signal has a maximum detected level when analyzed in such a way that a polarization beam splitter (PBS) decomposes both of the $E_x$ and $E_y$ mutually-orthogonally polarized data-carrying signal contributions into respective equal portions in each of its two orthogonal outputs. Such would be the case, for instance, if the $E_x$ and $E_y$ data-carrying contributions of the SUT are linear and are oriented at 45 degrees with respect to the PBS axes, which serve as respective analyzers. More generally, the mutually-orthogonal PBS axes would satisfy $S_1=0$ (e.g. linear at 45 degrees, left- and right-circular, or any intermediate SOP lying in the plane defined by $S_2$ and $S_3$). Although most commercial PBS's only have linear-analysis axes, the combination of an "upstream" Polarization Controller (PC) with a commercially-available linear-axis PBS enables any such $S_1=0$ condition to be met regardless of the respective SOPs of $E_x$ and $E_y$.

Figure 8:
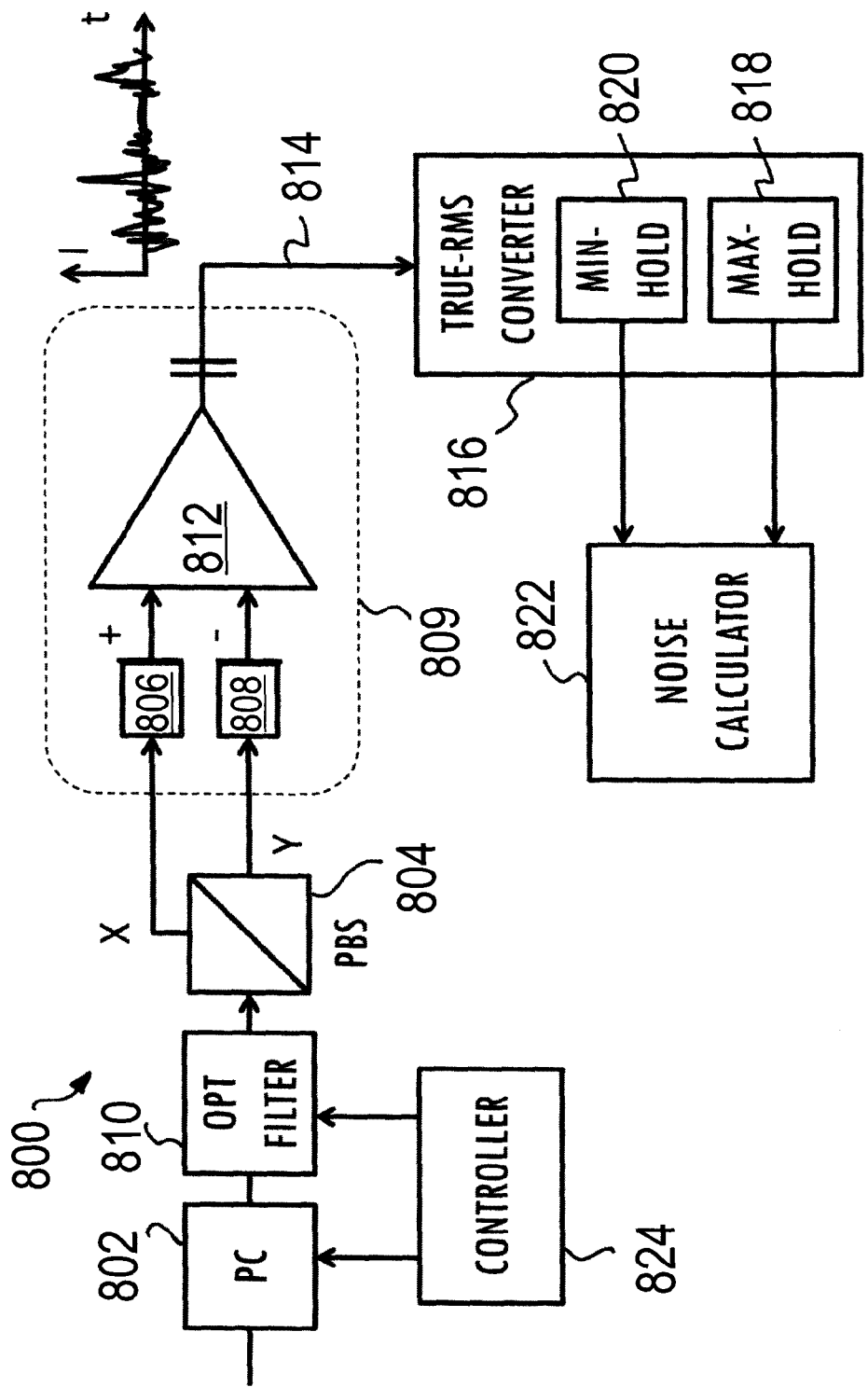
FIG. 8 is a block diagram illustrating an embodiment of an acquisition system for implementing a method in accordance with one embodiment.

FIG. 8 illustrates a first embodiment of a system 800 for determining an in-band noise parameter on a polarization-multiplexed SUT. A polarization-optics arrangement comprises a Polarization Controller (PC) 802 and a Polarization Beam Splitter (PBS) 804 which together determine a polarization-analyzer condition comprising, in this case, two mutually-orthogonal analyzer axes (i.e. antipodal on the Poincaré sphere). By varying the PC 802, the polarization-optics arrangement provides a multiplicity of distinct polarization-analyzer conditions. The polarization-analyzed components of the SUT at the output of the PC 802 and PBS 804 are then respectively detected by detectors 806, 808 of a balanced-detection module 809 which have an electronic bandwidth significantly lower (at least ten times lower) than the symbol rate of the SUT. Here, the bandwidth is 20 MHz, although other values may be envisaged. An optical filter 810 serves both to spectrally isolate the desired SUT and to limit the ASE contribution to approximately this same spectral width. In this embodiment the optical filter 810 is a supergaussien filter having a Full-Width-Half-Maximum (FWHM) bandwidth of 40 GHz. The respective electrical signals then are input respectively to two inputs of a Differential Amplifier (DA) 812, also included in the balanced-detection module 809, to produce an electrical signal 814. In this embodiment, the amplifier is advantageously ac-coupled to block the dc component from being part of the acquired signal. As will be discussed hereinbelow, the dc part, if not blocked or if measured by other means, can be used for estimating any signal imbalance $P_x/P_y$ or PDL. However, the dc component should still be removed (either by hardware or by signal processing) before calculating the ratio Γ. Different random polarization-analyzer conditions are obtained successively using the PC 802 (i.e. such that the analyzer axes defined by the PC 802 and PBS 804 combination substantially uniformly cover the Poincaré sphere). The PC 802 and the central wavelength of the optical filter 810 are varied using a controller 824. The rms value of the electrical signal 814 (referred to elsewhere in this specification as a statistical parameter) is acquired by employing a true-rms converter 816 and the acquisition is repeated in time as the polarization-analyzer conditions are varied using the PC 802, to provide a set of rms values. Both the maximum and minimum acquired rms values are stored in respective max-hold 818 and min-hold 820 registers of the true-rms converter 816. In this embodiment, the true-rms converter 816 is implemented as an analog to digital converter followed by a signal processor (digital rms converter) but it is noted that other true-rms converters known in the art, such as a thermal converter or an analog electronic converter, may also be employed. A noise calculator 822 calculates the ratio Γ as the ratio between the squares of max-hold and min-hold values (corresponding to the ratio between the maximum and minimum variances of the electrical signals). The noise calculator 822 also calculates the OSNR from the ratio Γ and predetermined constants specific to the modulation format (assuming that the modulation format is known), as discussed hereinabove. Although the set-up illustrated in FIG. 8 has the advantage of simplicity and a reduced parts count, the maximum and minimum values are not acquired simultaneously and hence acquisitions need to be taken at a considerable number of (normally unknown) polarization-analyzer conditions (i.e. SOPs). Nonetheless, this may be perfectly adapted for certain applications, for instance certain monitoring applications.

Figure 9:
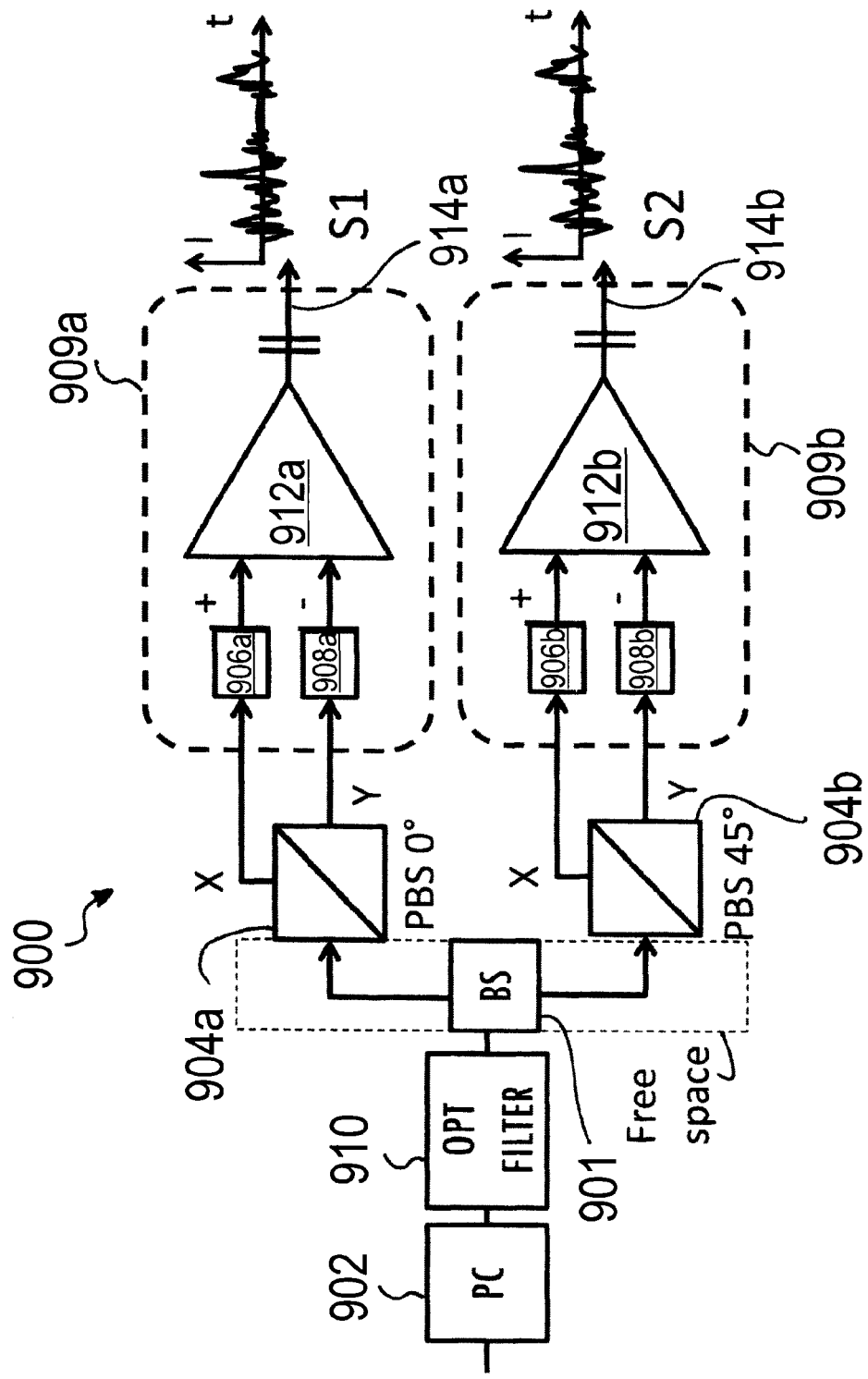
FIG. 9 is a block diagram illustrating a variant of the acquisition system FIG. 8 wherein the max-hold and min-hold data are acquired simultaneously.

FIG. 9 illustrates a variant of the optical acquisition system 800 of FIG. 8, for which the complementary maximum and minimum ac-coupled electrical signals are measured simultaneously. The acquisition system 900 of FIG. 9 is similar to that of FIG. 8 except that, in FIG. 9, the optical path is split in two using a Beam Splitter (BS) 901 before reaching PBS 904a and 904b, in order to simultaneously provide two distinct (but correlated) polarization-analyzer conditions ($S_1$ and $S_2$). Components of the system 900 of FIG. 9 that are similar to that of the system 800 of FIG. 8 will not be repetitively described.

As before, the PC 902 is varied randomly (i.e. such that the Stokes parameters corresponding to the analyzer axis defined by the PC 902 and PBS 904a, 904b combination are distributed on the Poincaré sphere in a substantially uniform fashion). As in the system 800, the PC 902 and the central wavelength of the optical filter 910 are set using a controller (not shown). The polarization-analyzed components of the SUT at the output of the PBS 904a and 904b are then detected by detectors 906a, 906b, 908a, 908b of balanced-detection module 909a, 909b and amplified by ac-coupled differential amplifiers 912a, 912b to produce electrical signals 914a, 914b. Although also not illustrated in FIG. 9, electrical signals 914a, 914b respectively at outputs $S_1$ and $S_2$ are acquired by employing true-rms converters as in FIG. 8 and maximum and minimum acquired rms signal values are stored in separate max-hold and min-hold registers for each electrical signal. It should be noted that the "true" maximum for a particular SUT may correspond to either of the two outputs $S_1$ and $S_2$, in which case the "true" minimum would correspond to the other. Hence, this embodiment advantageously requires a reduced number of polarization-analyzer conditions (i.e. PC settings), albeit with a modest increase in cost due to the need for additional components. Again, the OSNR is deduced from the ratio of the max-hold and min-hold values in a noise calculator (not shown).

The maximum data-carrying signal contribution corresponds to $S_1=0$ (e.g. $S_2$, $S_3$, or any combination thereof), for which the "signal-signal" beat contribution to the detected electrical signal is maximum. Consequently, the minimum data-carrying signal contribution corresponds to $S_1$, for which the "signal-noise" beat contribution dominates, and hence is representative of the optical noise level. Since the minimum value is more difficult to find than the maximum (the minimum represents a point on the Poincaré sphere, whereas the maximum represents a great circle on the sphere), it may be advantageous in certain circumstances to employ a polarization tracking system that utilizes the rf power as error signal to a servo-regulator, which then provides servo-control of the PC. In this way, the PC may be set so that the error signal (RF power, i.e. variance) is always minimized for any input SOP to the PC. An example of such a commercially available polarization tracker is the POS-002 Polarization Tracker marketed by General Photonics Corporation. In this case, the rf output, e.g. S1, shown in FIG. 9 may be used to provide the error signal necessary for the servo-feedback.

The minimized error signal is equivalent to a minimized variance $<s_1^2>$, the denominator in Eq. (1). Hence, at the same time that the minimum is found at output $S_1$, the denominator in Eq. (1) is measured. In the case of the embodiment of FIG. 9, this directly-measured minimum value may then be compared with the maximum value obtained on the output $S_2$. In the case of the embodiment of FIG. 8, it is also possible to control the PC 802 with servo-feedback. In this case, the average power may be used in combination with the minimum value to define a different ratio Γ', as defined herein below.

Figure 10:
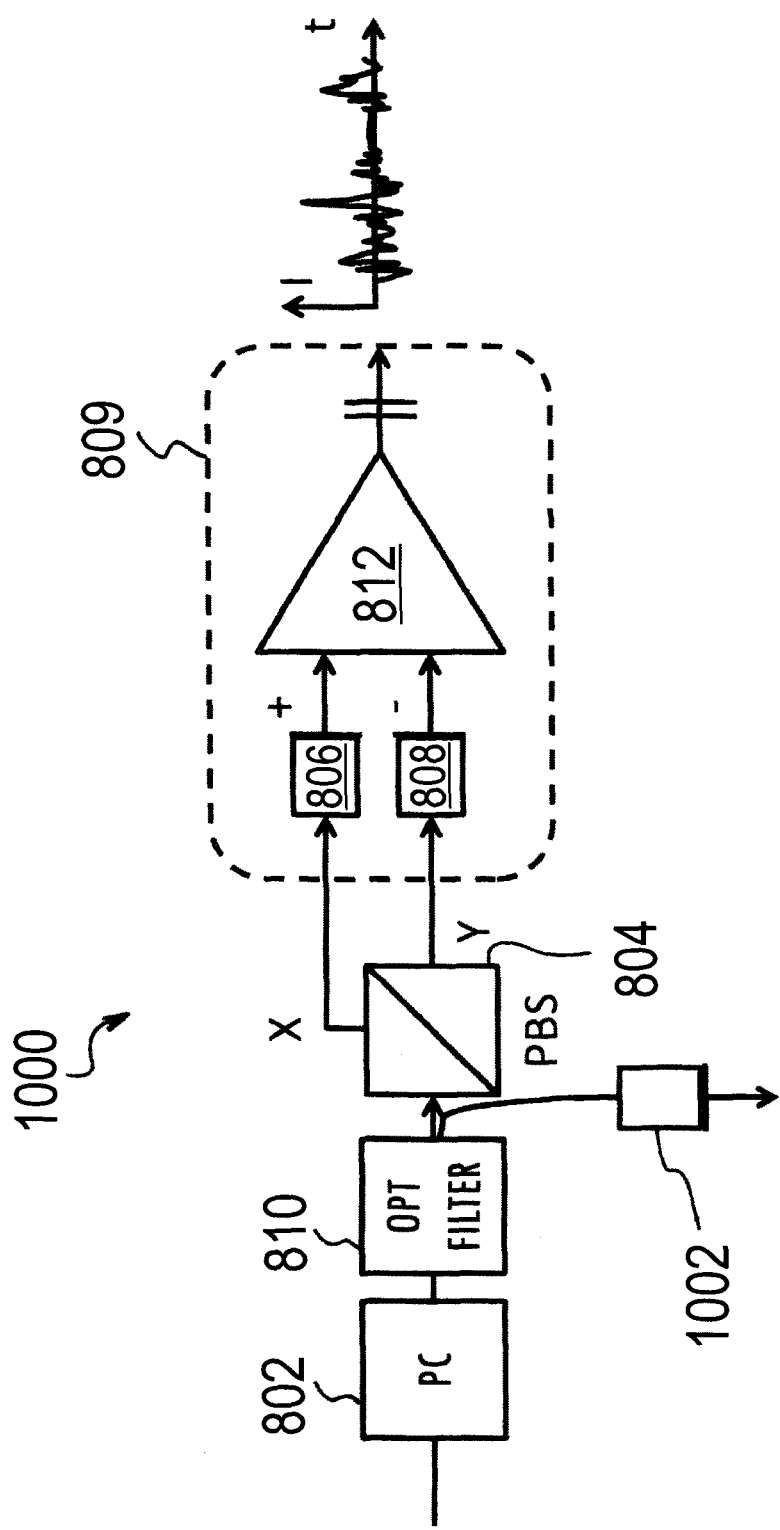
FIG. 10 is a block diagram illustrating another variant of the acquisition system FIG. 8 wherein both the average power and the min-hold value are acquired.

For this purpose, FIG. 10 shows a variant of the optical acquisition system 900 of the embodiment of FIG. 8, which is adapted to measure the average power in combination with the minimum value. The system 1000 has similarities with the system 800 of FIG. 8 and similar components will not be repetitively described. In the system 1000 of FIG. 10, only one polarization-analyzer condition is provided at a time, but in addition, the non-analyzed average power is also concurrently acquired. Thus, the resulting min-hold value may then be "normalized" with respect to a portion of the (non-analyzed) SUT power. In the system 1000 of FIG. 10, the average power is measured using an additional detector 1002 positioned before the PBS 804. For example, the additional detector 1002 may be an optical power meter having an electronic bandwidth that may be less than the electronic bandwidth of the detection electronics for the analyzed ac-coupled signal. An alternative to measuring the average power before the PBS with the additional detector would be to measure the average currents of the two detectors before they are input into the balanced receiver.

Since the lens size is approximately proportional to the optical signal power, one can exchange the numerator of Eq. (1) with the square of the average optical power, to define an alternative ratio r that is analogous to the ratio Γ of Eq. (1):

$$\Gamma' = \frac{k(P_{tot})^2}{\langle s_1^2 \rangle} \tag{8}$$

where k is a constant. Then, in combination with a servo-locked polarization-tracking device that measures the denominator $<s_1^2>$ of Eq. (8), it may be possible to carry out the OSNR measurement more rapidly with the embodiment of FIG. 10, than with the embodiment of FIG. 8 or that of FIG. 9.

Figure 11:
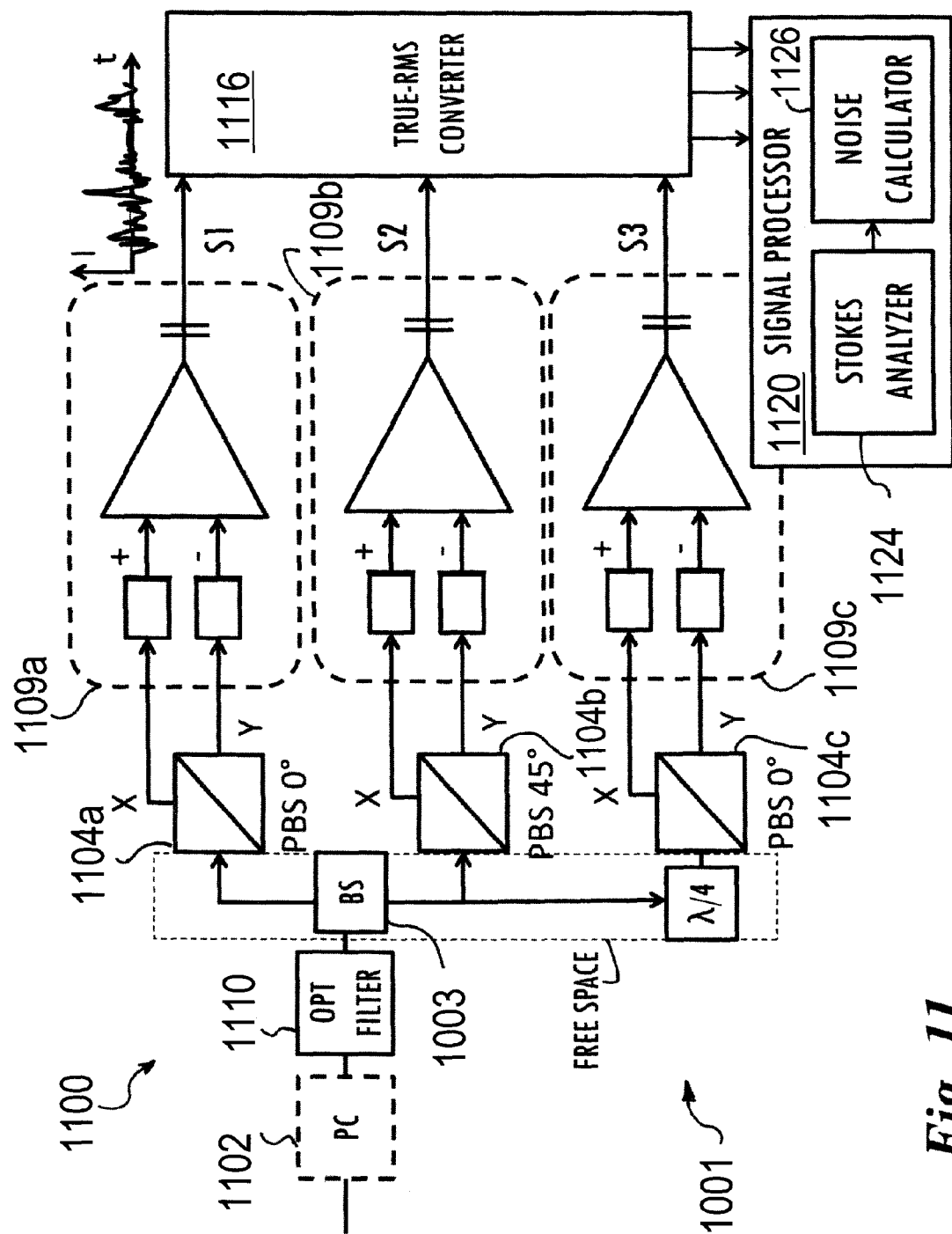
FIG. 11 is a block diagram illustrating another embodiment of an acquisition system which employs a polarimeter.

FIG. 11 shows another embodiment of an optical acquisition system 1100 for which the polarization analysis is carried out by means of a polarimeter 1101, i.e. a device that concurrently measures optical power analyzed according to three polarization-analyzer conditions that are mutually orthogonal in Stokes-parameter space, i.e. $S_1$, $S_2$, and $S_3$, and which serves as a polarization-optics arrangement. The polarimeter design used in the embodiment of FIG. 11 is similar to that of commercially available polarimeters. As before, a narrowband optical filter 1110 is disposed in the optical path just before the input to the polarimeter. In this case, a polarization controller PC 1102 is not fundamentally needed, but may aid in optimizing the ultimate sensitivity of the OSNR measurement by averaging. At the input of the polarimeter 1101 is a beam splitter 1103 that splits incoming light onto three separate optical paths, each comprising a PBS arrangement 1104a, 1104b, 1104c configured to analyze the SUT simultaneously according to three conditions that are mutually orthogonal in Stokes-parameter space. The analyzed SUT are detected by balanced-detection modules 1109a, 1109b, 1109c to produce respective electrical signals 1114a, 1114b, 1114c at outputs S1, S2, S3. As in the system 800 of FIG. 8, a true-rms converter 1116 acquires the rms value of the electrical signals $S_1$, $S_2$, $S_3$. However, in this case, three polarization-analyzer conditions that are mutually orthogonal in Stokes-parameters space are obtained simultaneously.

The embodiment of FIG. 11 advantageously provides rapid OSNR determination. After one acquisition (e.g. of approximately 50-μs duration, i.e. a duration suitably shorter than the timescale of significant SOP changes of the input SUT), the rms value acquired at the three ac-coupled differential outputs $S_1$, $S_2$, $S_3$ are treated mathematically using standard Stokes-analysis algorithms (e.g. including Singular Value Decomposition—SVD) in order to directly determine the ratio Γ as defined in Eq. 2, without necessarily directly acquiring the maximum and minimum values, corresponding to the "max-hold" and "min-hold" values of the previous embodiments. Accordingly, the acquired rms values are processed by a signal processor 1120 comprising a Stokes analyzer 1124 and a noise calculator 1126. The Stokes analyzer 1124 performs the Stokes analysis to determine the ratio Γ as defined in Eq. 2. The noise calculator 1226 then calculates the OSNR from the ratio Γ and predetermined constants specific to the modulation format, as discussed hereinabove.

The system 1100 of FIG. 11 may also allow DGD correction as described hereinabove. Because the DGD correction method described hereinabove requires a determination of the lens normal in Stokes-parameter space, a polarimeter, such as the one of FIG. 11 or the one of FIG. 12 described hereinbelow, is needed to implement this method. In order to implement the DGD correction method, the optical filter 1110 may comprise two tunable optical filters 1100 which, in normal operation are both centered on the optical signal spectrum but which can be properly offset from one another in wavelength to provide the two spectral slices of the signal spectrum, corresponding to the "red" ($\omega1$) and "blue" ($\omega2$) wings of the signal as mentioned hereinabove. Alternatively, the optical filter 1100 may also be a wavelength-tunable filter having a tunable optical bandwidth. In this embodiment, the Stokes analyzer 1124 is employed to determine the lens normal $\hat{n}_{\omega1}$, $\hat{n}_{\omega2}$ for the two spectral slices and the noise calculator 1126 is configured to calculate the factor $\gamma(1-\gamma)\Delta\tau^2$ and calculate the OSNR using Eq. (6a).

In another embodiment (not specifically illustrated), the hardware is similar to that of the system 1100 of FIG. 11 but is employed differently so that the processing rather resembles that of the system 900 of FIG. 9. This embodiment has the advantage of not being sensitive to polarimeter calibration for OSNR measurements while allowing DGD correction. In this embodiment, the rms values of the electrical signals $S_1$, $S_2$, $S_3$ are acquired by the true-rms converter 1116 and the acquisition is repeated in time as the polarization analysis conditions are varied using the PC 1102, to provide a set of rms values. During this operation, the optical filters 1100 are both centered on the optical signal spectrum. The maximum and minimum acquired rms values of $S_1$, $S_2$ and $S_3$ are stored in respective max-hold and min-hold registers of the true-rms converter 1116. The noise calculator 1126 calculates the ratio $\Gamma$ between the squares of the maximum max-hold value and the minimum min-hold value. In addition, in order to apply the DGD correction method, SOP measurements are performed for two spectral slices of the signal spectrum, corresponding to the "red" ($\omega1$) and "blue" ($\omega2$) wings of the signal (by alternately offsetting one of the optical filters 1100 relative to the optical signal spectrum), and the Stokes analyzer 1124 determines the lens normal $\hat{n}_{\omega1}$, $\hat{n}_{\omega2}$ for the two spectral slices. The noise calculator 1126 then calculates the factor $\gamma(1-\gamma)\Delta\tau^2$ and the OSNR is calculated using Eq. (6a), the measured ratio $\Gamma$, the calculated factor $\gamma(1-\gamma)\Delta\tau^2$ and predetermined constants. It is noted that it is also possible to control the PC 1102 with servo-feedback in this case.

Figure 12:
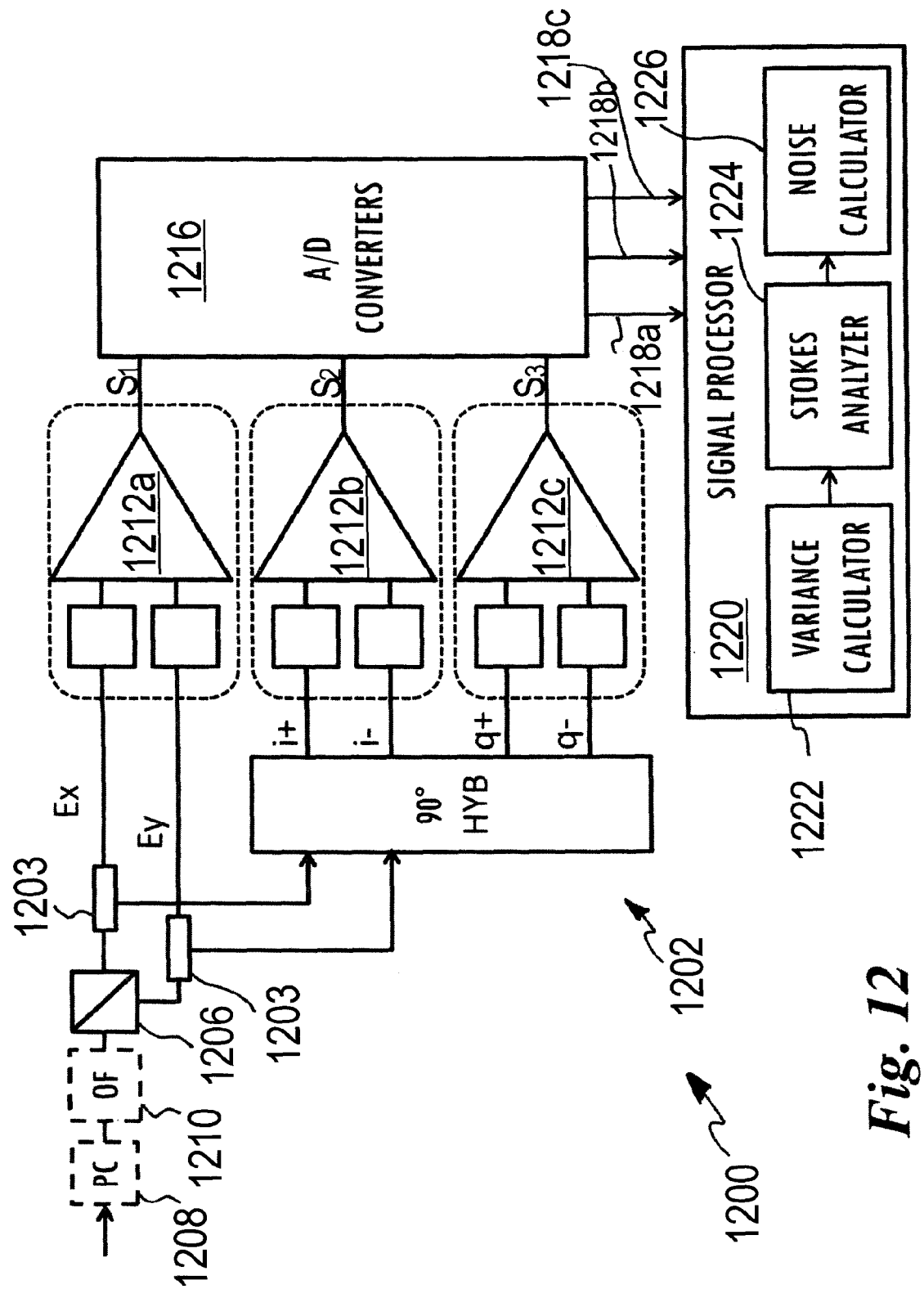
FIG. 12 is a block diagram illustrating yet another embodiment of an acquisition system which employs a polarimeter, based on a 90°-hybrid.

FIG. 12 shows a variant of the embodiment of FIG. 11 which employs a polarimeter 1202 incorporating a commercially-available optical mixer comprising a 90-degree hybrid 1204, a PBS 1206 and polarization-maintaining 50/50 couplers 1203. Again, the ratio $\Gamma$ may be determined from standard Stokes-analysis algorithms. The optical acquisition system 1200 of FIG. 12 further distinguishes from the previous ones by the fact that the amplifiers 1212a, 1212b, 1212c are not ac-coupled. This allows the system 1200 to not only acquire the ac values of the output electrical signals $S_1$, $S_2$, $S_3$, but also the dc values. As explained hereinbelow, the dc values may be employed to apply a PDL correction on the measurement. The output electrical signals $S_1$, $S_2$, $S_3$ are acquired using analog-to-digital converters 1216. The resulting acquired signals 1218a, 1218b, 1218c are then processed by a signal processor 1220, which includes a variance calculator 1222, a Stokes analyzer 1224 and a noise calculator 1226. The variance calculator 1222 processes the acquired signals 1218a, 1218b, 1218c to determine their variance over the acquisition period (which is directly related to the ac component of the acquired signal and referred to elsewhere in this specification as a statistical parameter). The Stokes analyzer 1224 performs Stokes analysis to determine the ratio $\Gamma$ as defined in Eq. 2. The noise calculator 1226 then calculates the OSNR from the ratio $\Gamma$ and predetermined constants specific to the modulation format, as discussed hereinabove. It is noted that the signal processor may optionally also calculate the dc component of the output electrical signals $S_1$, $S_2$, $S_3$ from the acquired signals 1218a, 1218b, 1218c. Optional polarization controller PC 1208 and optical filter 1210 may be employed, along with control means for interfacing with the two (not shown).

From the above, it will be understood that the embodiment of FIG. 11 may also be modified to apply a PDL correction by eliminating the ac-coupling from the balanced-detection modules 1109a, 1109b, 1109c and employing a digital rms converter to serve as the true-RMS converter 1116.

It will further be understood that, as with the system 1100 of FIG. 11, the system 1200 of FIG. 12 may also employ processing similar to that of the system 900 of FIG. 9, meaning that the variance values of the electrical signals $S_1$, $S_2$, $S_3$ are determined by the variance calculator 1222 and the acquisition is repeated in time as the polarization-analyzer conditions are varied using the PC 1208, to provide a set of variance values. The maximum and minimum variance values of $S_1$, $S_2$ and $S_3$ are registered by the signal processor 1220 and input to the noise calculator 1226 to calculate the ratio $\Gamma$. In this case, no Stokes-analysis is necessary to calculate the "non-DGD-corrected" ratio $\Gamma$. However, the polarimeter 1202 is employed to implement the DGD correction in accordance to the DGD correction method as described hereinabove.

Figure 13:
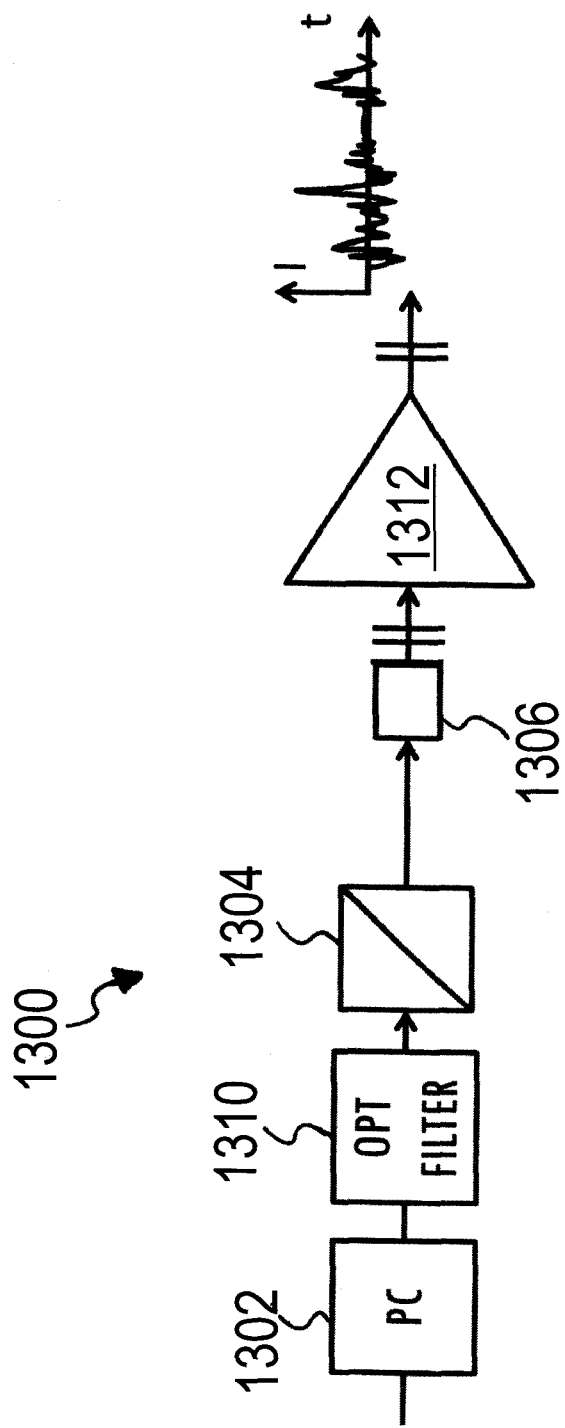
FIG. 13 is a block diagram illustrating a variant of the acquisition system of FIG. 8 wherein the polarization-analyzed component of the signal-under-test is directly detected instead of employing a differential amplification.

FIG. 13 shows another variant of the optical acquisition system 800 of the embodiment of FIG. 8 wherein, instead of employing differential detection of the two mutually-orthogonal polarization-analyzed components, only one polarization-analyzed component of the signal-under-test is directly detected and hence a differential amplifier is not required. As in the other embodiments, the system 1300 of FIG. 13 employs a polarization controller 1302, an optical filter 1310 and a PBS 1304. However, a single detector 1306 is employed and the amplifier 1312 is not differential. Optionally, the amplifier 1312 may be ac-coupled to electrically block the dc component, as in the embodiment of FIG. 8. Alternatively, the dc component could also be acquired and its contribution removed computationally in the post processing when calculating the ratio $\Gamma$. As in the embodiment of FIG. 8, the ratio $\Gamma$ is calculated as the ratio between the maximum and the minimum acquired variances (i.e. squares of the respective rms values). Although not illustrated herein, this same modification is equally applicable to the embodiments of FIGS. 9 to 12.

It should be noted that other variants of the optical acquisition system may be envisaged. For example, the Stokes polarimeter of FIG. 11 or FIG. 12, which directly (and simultaneously) measures Stokes parameters $S_1$, $S_2$ and $S_3$, can be replaced by any other optical system that allows recovery of the SOP of the signal. For example, a polarimeter can be used, which employs four polarization analyzers having respective axes equidistantly distributed on the Poincaré sphere (i.e. at vertices of an equilateral tetrahedron), as described in US 2003/0075676 to Ruchet et al. The Stokes parameters may be reconstructed from such a measurement and Singular Value Decomposition applied thereto.

Embodiments of this invention may permit estimation of another impairment, the Polarization Dependent Loss (PDL). Such a loss may be induced along the transmission path (e.g. a fiber link, including noise-inducing amplifiers and possible ROADMs). If the PDL is primarily induced close to the transmitter (i.e. upstream from the any optical amplifier) it affects substantially only the data-carrying signal contribution of the PolMux signal and not any superposed noise added thereto downstream.

In the following description, the PDL is defined as the magnitude of a corresponding "PDL vector", the orientation of which corresponds to the SOP resulting in maximum transmission, i.e. minimum loss. For simplicity, it is assumed that the PDL is induced at a particular spatial location along the fiber link (i.e. a "lumped" PDL) and that the ASE noise is added upstream from this lumped PDL. In this way, the PDL acts upon the noise and the signal equally. It may be assumed that, during the time interval of a single acquisition of the analyzed SUT (typically roughly proportional to the reciprocal of the electronics bandwidth, e.g. approximately 50 µs), the orientation of the effective PDL axis changes negligibly.

Figure 14:
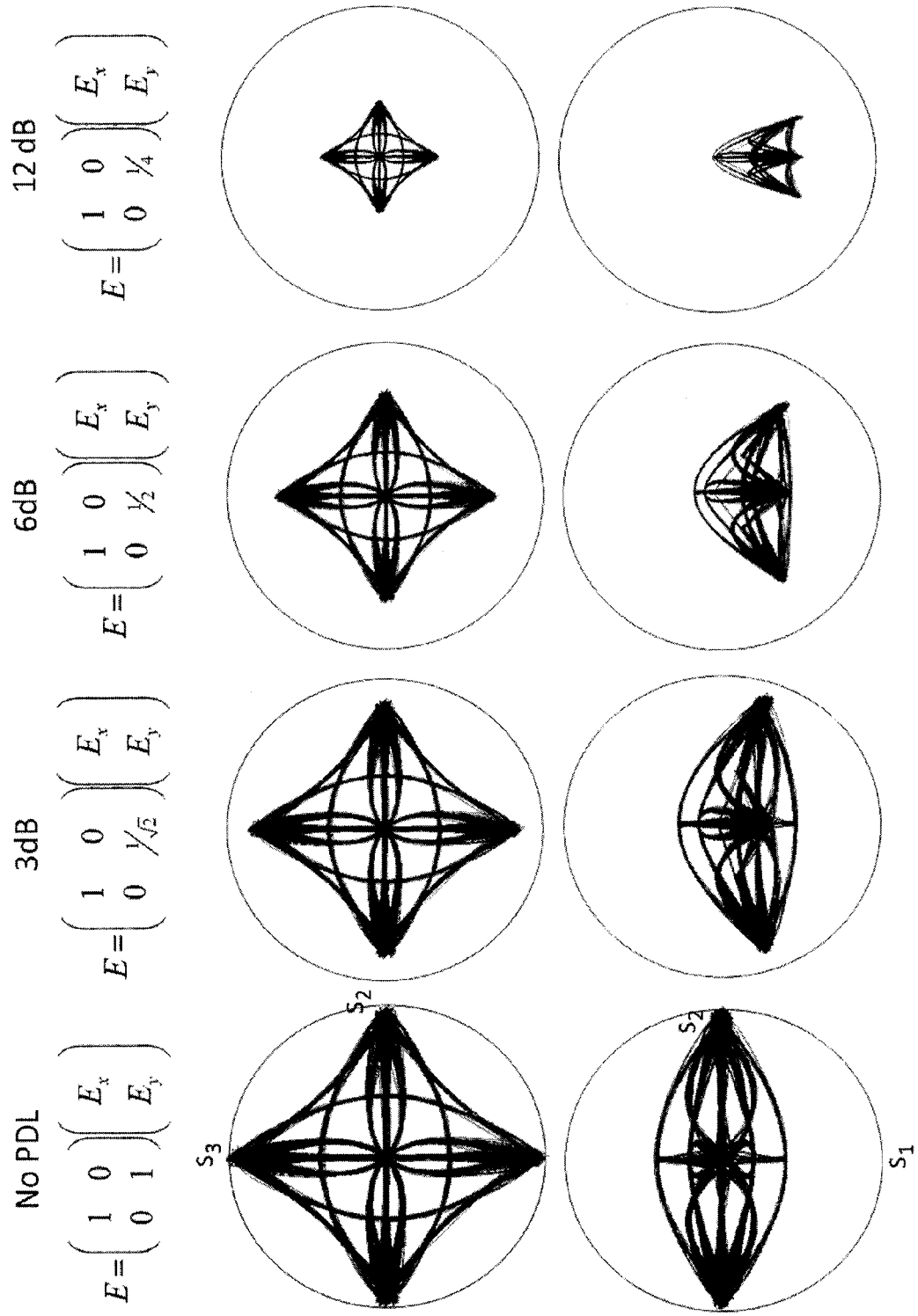
FIG. 14 is a combination of graphs showing results of simulations which illustrate how a Polarization Dependent Loss (PDL) vector aligned along the polarization axis corresponding to one of the polarization-multiplexed components changes the lens-shaped distribution in Stokes-parameter space.
Figure 15:
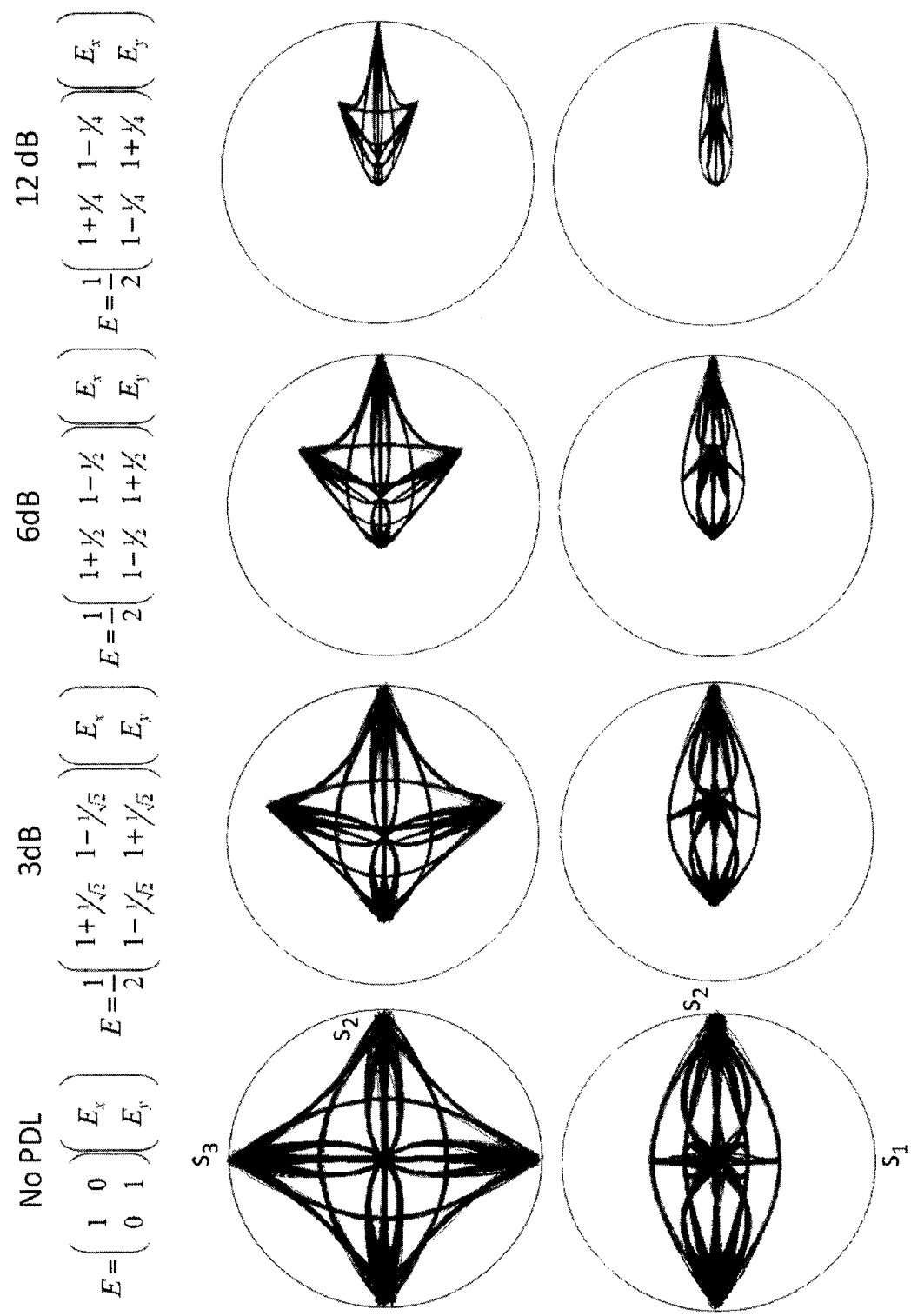
FIG. 15 is a combination of graphs showing results of simulations which illustrate how a Polarization Dependent Loss (PDL) vector aligned at 45 degrees with respect to the polarization-multiplexed components changes the lens-shaped distribution in Stokes-parameter space.

A non-zero PDL has the effect of introducing an offset of the lens axis from the origin in the Poincaré sphere representation. This offset is not visible with ac-coupled data, but is discernable if the dc component of the signal is retained. FIG. 14 shows, from a computer simulation, how the PDL leads to such a shift, for PDL values of 0, 3, 6, and 12 dB, in the case where the maximum transmission axis of the PDL element is aligned with $E_x$, i.e. along $S_1$. The simulation shows what would actually be seen with a very high acquisition bandwidth (for simplicity, the noise level is assumed to be zero). FIG. 15 shows results of a simulation for the same PDL values, but where the maximum transmission axis of the PDL is assumed to be aligned at 45 degrees with respect to $E_x$ and $E_y$. In this case a dc component is present in the $S_2$ direction.

For clarity, the lenses presented above are simulated assuming unlimited measurement bandwidth. In embodiments of the present invention, the detection bandwidth is much lower than the symbol rate, and this low-pass filtering leads to significant distortion of these lenses. However, it is important to note that, notwithstanding this distortion, the dc components remain intact. Also note that all of the analysis presented hereinbelow is applied to low-pass-filtered signals.

Since the lens can be rotated in any direction before the SUT impinges upon the analyzer, the SVD algorithm, or any other plane-fitting algorithm, is used to find the axes: the lens normal $\hat{n}_1$, and axes $\hat{n}_2$ and $\hat{n}_3$ that are orthogonal to $\hat{n}_1$. In presence of PDL, the dc components can be removed temporarily in signal processing, before the axes $\hat{n}_1, \hat{n}_2, \hat{n}_3$ are retrieved in the case of SVD. After that, the dc components can be calculated as $DC_1=|<S·n_1>|/<P_{tot}>$, $DC_2=|<S·n_2>|/<P_{tot}>$, and $DC_3=|<S·n_3>|/<P_{tot}>$, where $S=(S_1,S_2,S_3)$, "·" represents the scalar product and $<P_{tot}>$ is proportional to $<(S_1^2+S_2^2+S_3^2)^{1/2}>$. It is noted that, in practical applications, the SOP of the signal varies in time, e.g. on account of environmental perturbations of the optical fiber. Accordingly, a measurement of the dc components is completed over a time interval that is shorter than $1/f_{SOP}$ where frequency $f_{SOP}$ characterizes the temporal rate of change of the SOP corresponding to the specific application. Of course, the measurement may be repeated in time and subsequently averaged.

Note that complete PDL analysis generally requires a full polarimeter, e.g. embodiments shown in FIGS. 11 and 12. However, PDL-related information can still be acquired from a simpler setup, e.g. embodiments shown in FIGS. 8, 9, and 10. For example, by minimizing $<s_1^2>$, the magnitude of the projection of the PDL vector on $E_x$ or $E_y$ may be obtained from the dc level of $S_1$.

Figure 16:
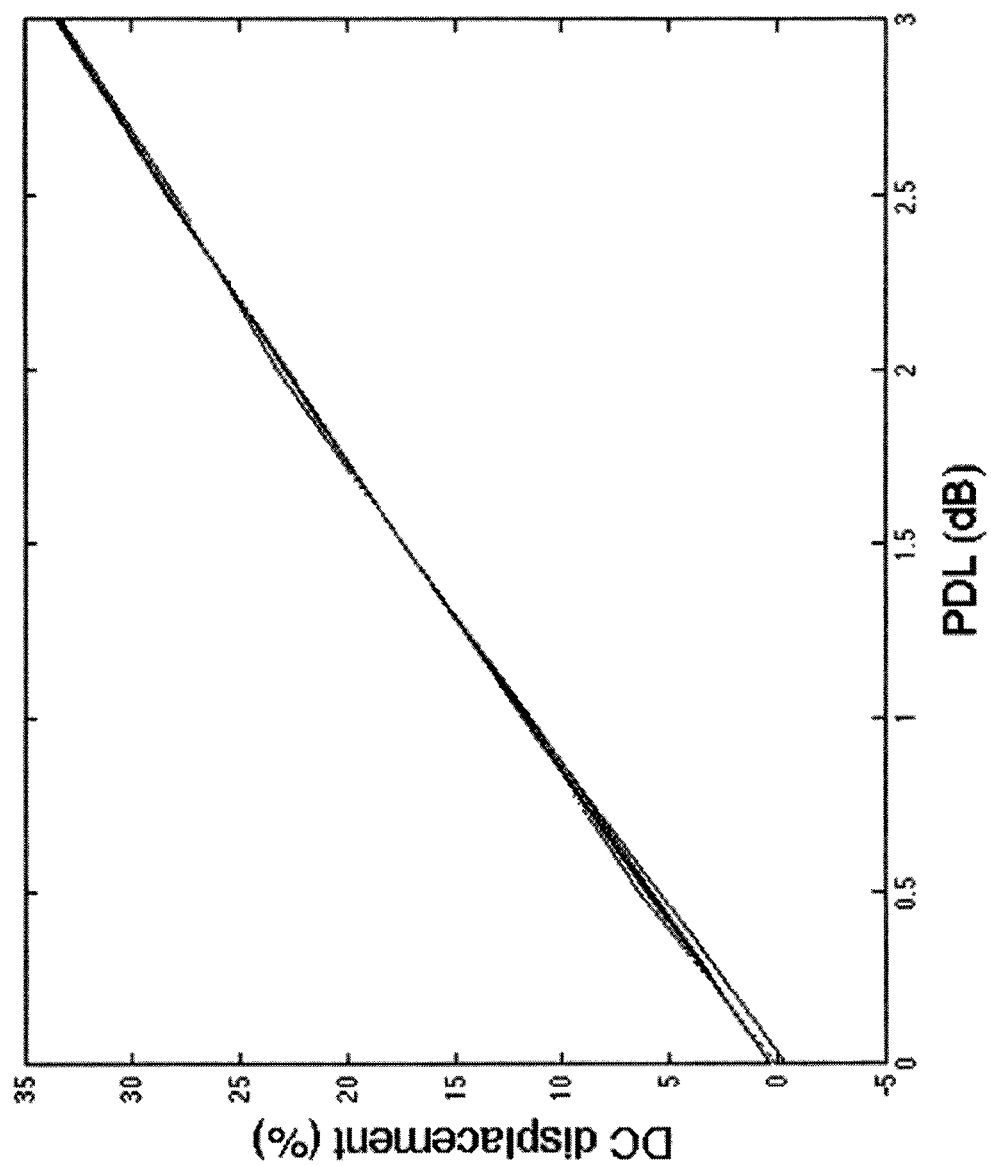
FIG. 16 is a graph showing the dc offset (in percentage) as a function of PDL (in dB) when the PDL vector is aligned with the SOP corresponding to one of the polarization-multiplexed components.

FIG. 14 shows that the lens transforms into a "tulip shape" for larger PDL values pointing in the $\hat{n}_1$ direction, which is equal to the $S_1$ direction if the maximum- and minimum-powers of the SUT are aligned with the x and y analyzer axes, respectively. The dc offset as a function of PDL is plotted in FIG. 16 for values of OSNR varying from 7 to 35 dB. The offset is linearly dependent on the PDL (in dB), i.e. $DC_1=k_1 \cdot PDL_{dB}$, where $k_1$ is approximately 11% per dB of PDL. The dc offset is independent of OSNR. Accordingly, from this measurement the PDL can be directly determined.

Illustrative PDL values such as the aforementioned 3 dB, and certainly 6 dB and 12 dB, are very much higher than PDL levels that likely would occur in practical networks. However, measurement of the dc offset permits much lower $P_x/P_y$ power imbalances to be quantified, provided that the polarimeter response is sufficiently well calibrated and stable. For instance, a 0.5-dB imbalance (i.e. PDL=0.5 dB) yields a 6% displacement of the dc component in the $\hat{n}_1$ direction (in comparison, a 3-dB imbalance yields a 33% displacement). Consequently, the responsivity difference in the balanced detector should be much less than 6% in order to measure such PDL levels.

Figure 17:
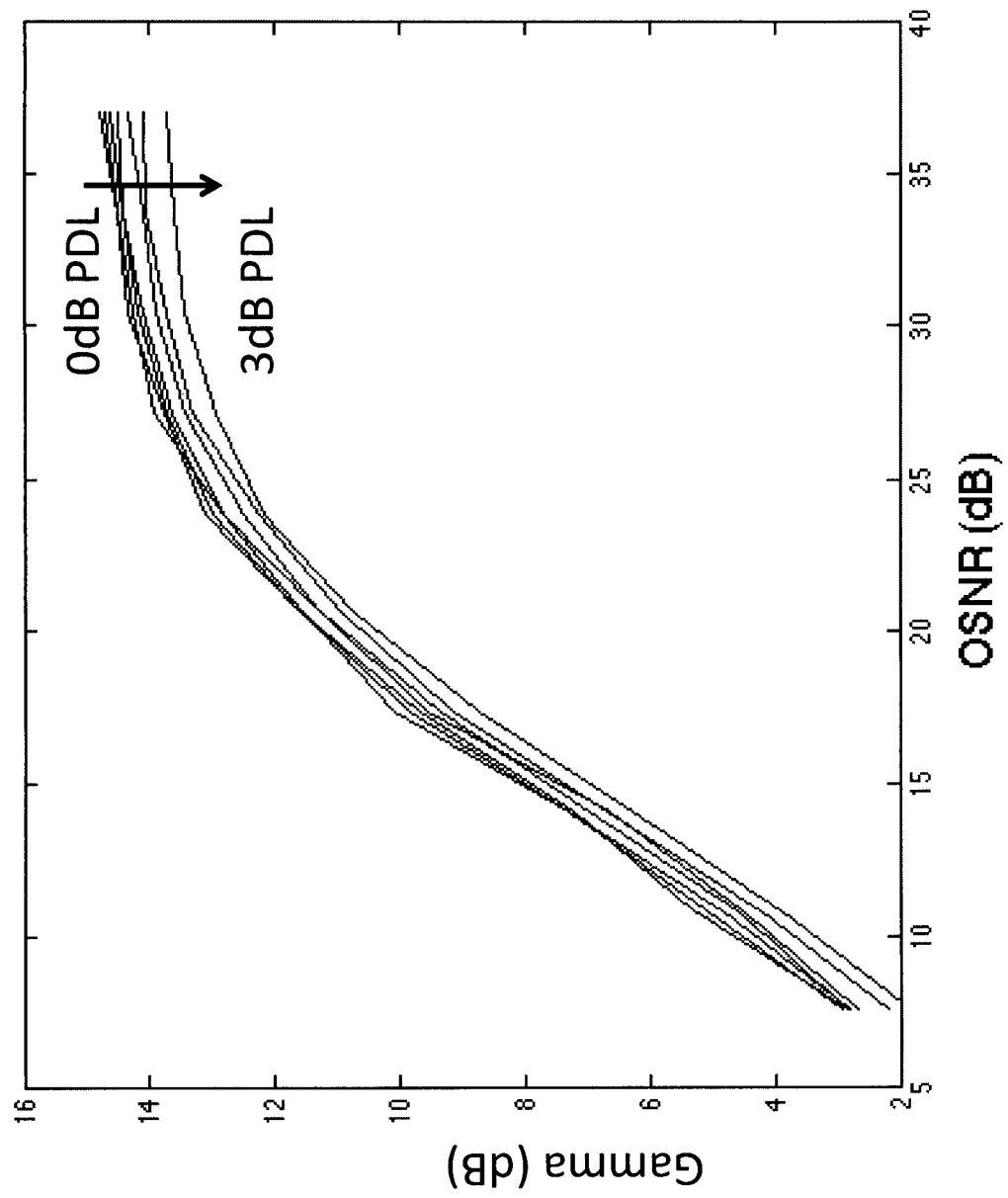
FIG. 17 is a graph showing the ratio Γ as a function of the OSNR when no PDL correction is applied, in the case where the PDL vector is aligned with one of the polarization-multiplexed components.
Figure 18:
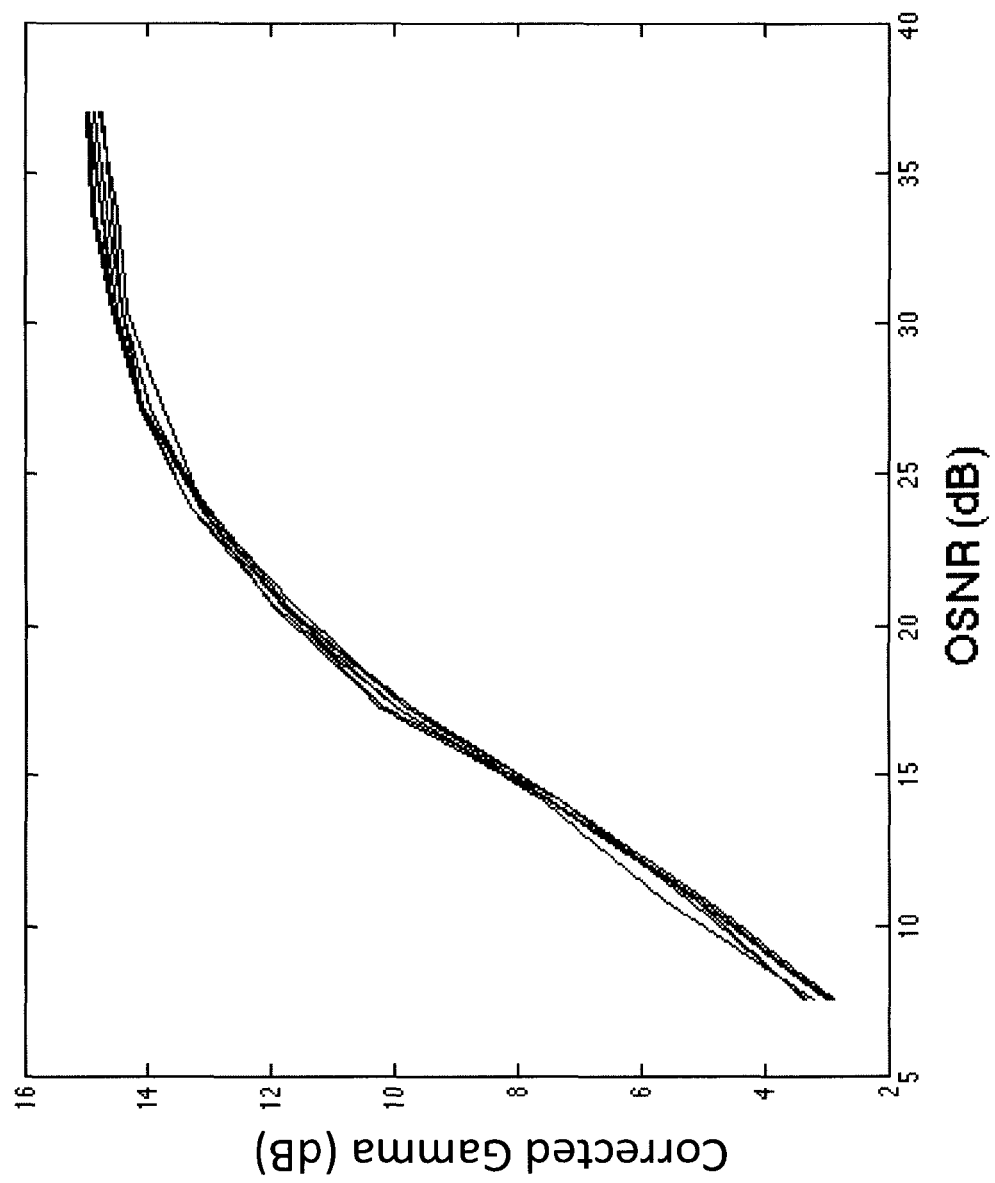
FIG. 18 is a graph showing the corrected ratio Γ'" as a function of the OSNR, in the case where the PDL vector is aligned with one of the polarization-multiplexed components.

FIG. 17 illustrates how PDL affects the relationship between measured ratio $\Gamma$ and the OSNR. The $\Gamma$ curve is attenuated by $a_1$ dB per dB of PDL ($a_1 \approx 1/3$). Since PDL can be estimated as described above, provided that the parameter $a_1$ is predetermined, one can calculate a "corrected" ratio $\Gamma$, i.e. $\Gamma'''=10^{a_1 PDL_{dB}/10}\Gamma$, as illustrated in FIG. 18. This corrected ratio $\Gamma'''$ is then used to calculate the OSNR.

Figure 19A:
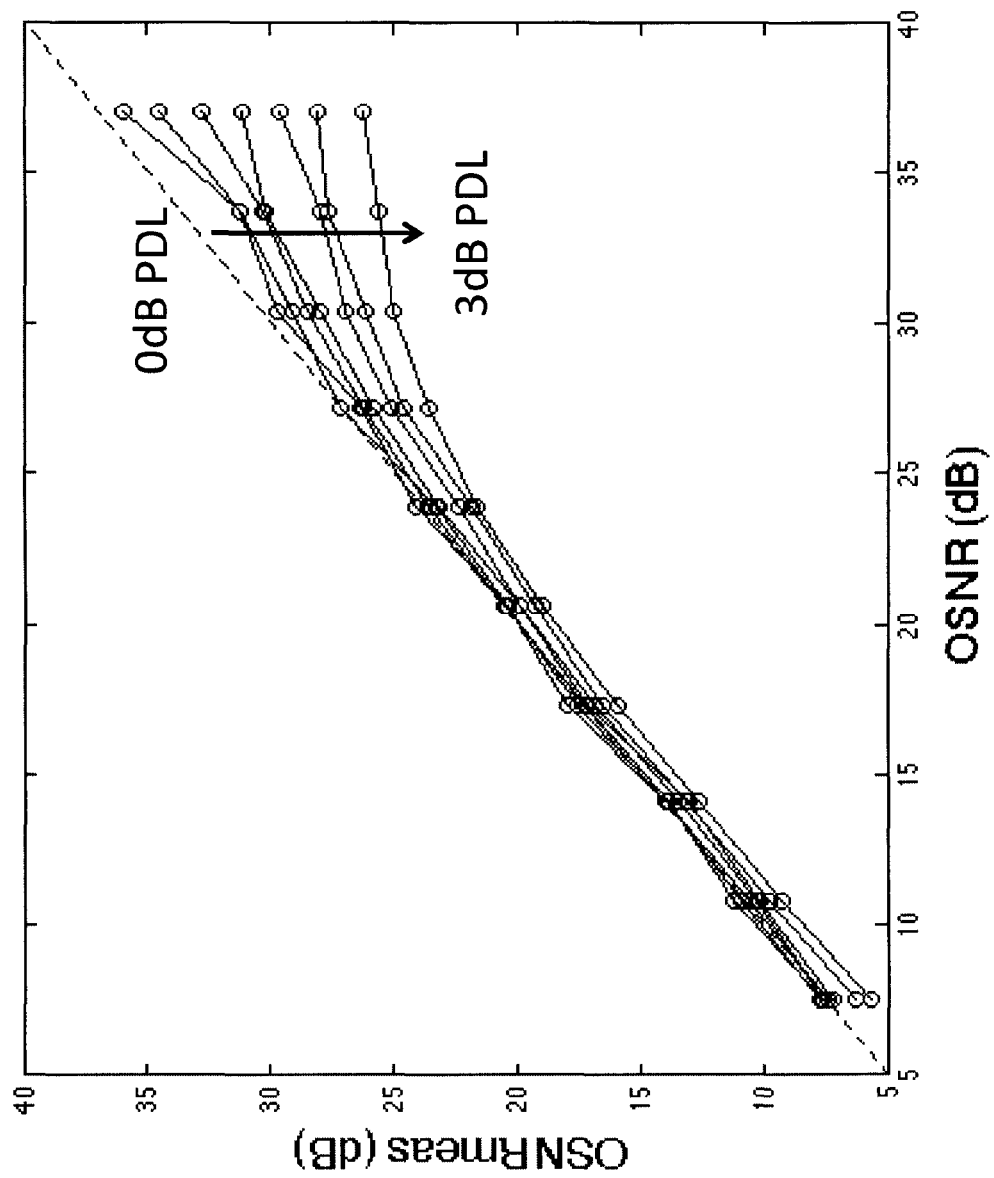
FIG. 19A and FIG. 19B are referred to together as FIG. 19 and are graphs showing the relationship between the OSNR determined by embodiments of the present invention and the "true" OSNR, in the case where the PDL vector is aligned with one of the polarization-multiplexed components and wherein in FIG. 19A no correction is applied and in FIG. 19B the corrected ratio Γ'" is applied.
Figure 19B:
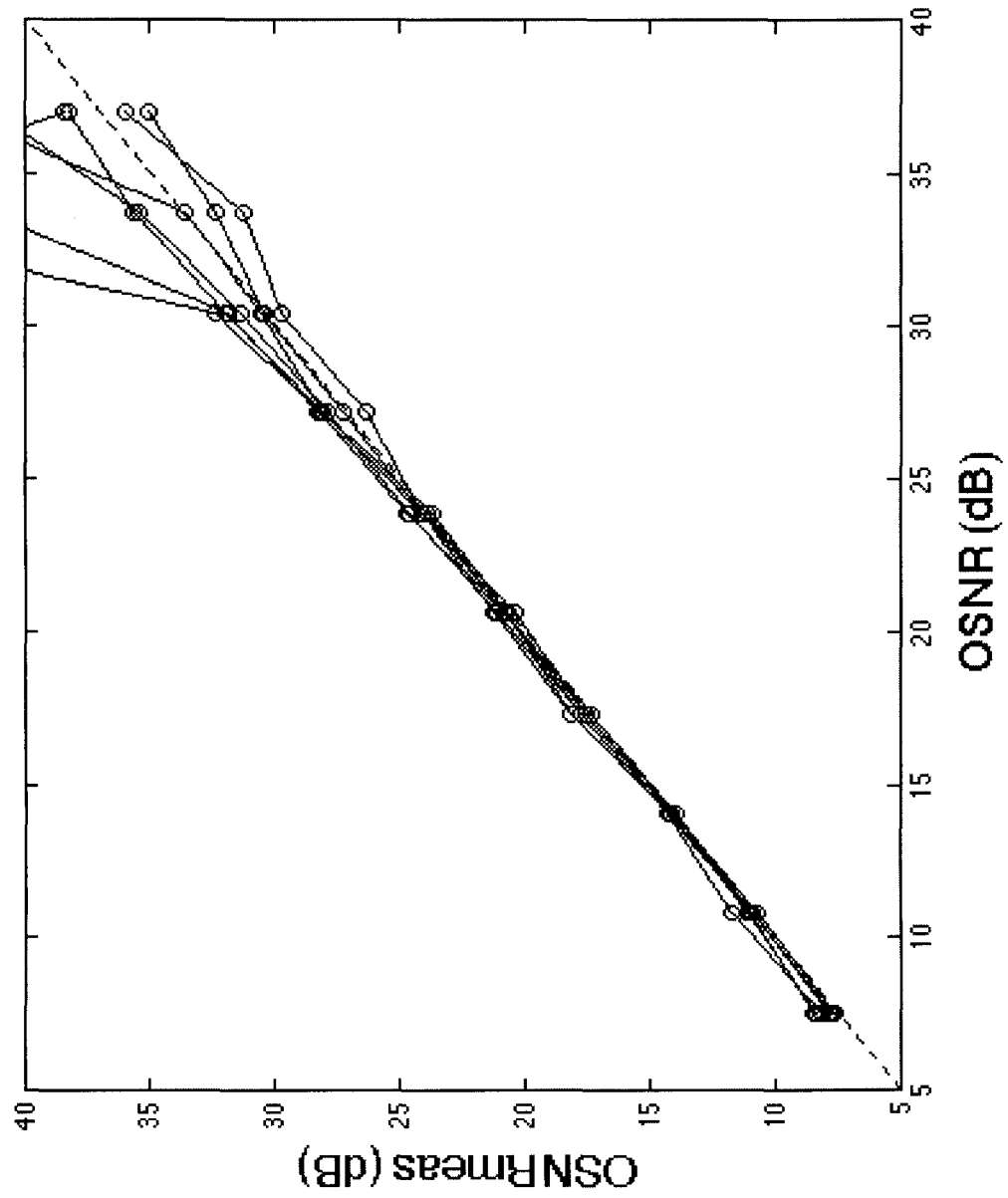

Since the ratio $\Gamma$ is underestimated, calculating OSNR therefrom leads to an underestimate for high OSNR values, as is apparent in FIG. 19A. If, instead, one applies the corrected ratio $\Gamma'''$ to the OSNR estimation, a more accurate PDL-compensated OSNR may be obtained as shown in FIG. 19B. Of course, for network architectures where the OSNR does not need to be accurately quantified beyond approximately 20 dB, or for optical links where it is a priori known that the PDL is <1 dB, application of such a PDL correction is usually unnecessary.

Figure 20:
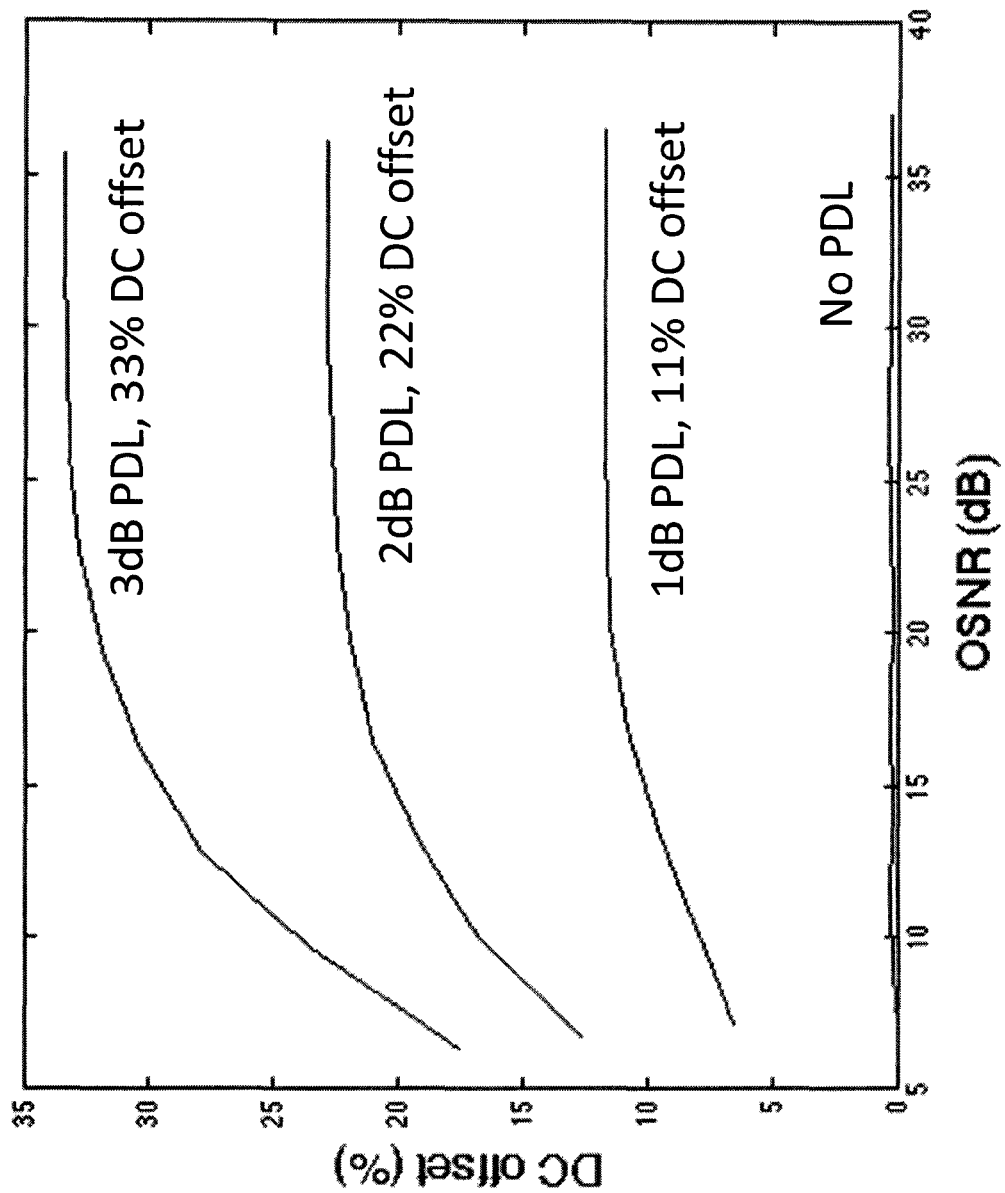
FIG. 20 is a graph showing the dc offset (in percentage) as a function of the OSNR when the dc offset is due to power imbalance in the transmitter between the polarization-multiplexed components.

A closely-related impairment to PDL under conditions described above, normally arising from the transmitter (rather than the transmission path), is unbalanced $E_x$ and $E_y$ power, i.e. the mutually-orthogonal data-carrying PolMux signal contributions are not equal. For this case, the dc offset in the $\hat{n}_1$ direction is a function of OSNR, since the absolute noise level superposed on powers $P_x$ and $P_y$ (corresponding to $E_x$ and $E_y$, respectively) is the same, as can be seen in FIG. 20. Hence, the $P_x/P_y$ imbalance would be underestimated for low OSNR, which is as expected since a large portion of the detected light is noise.

Figure 21A:
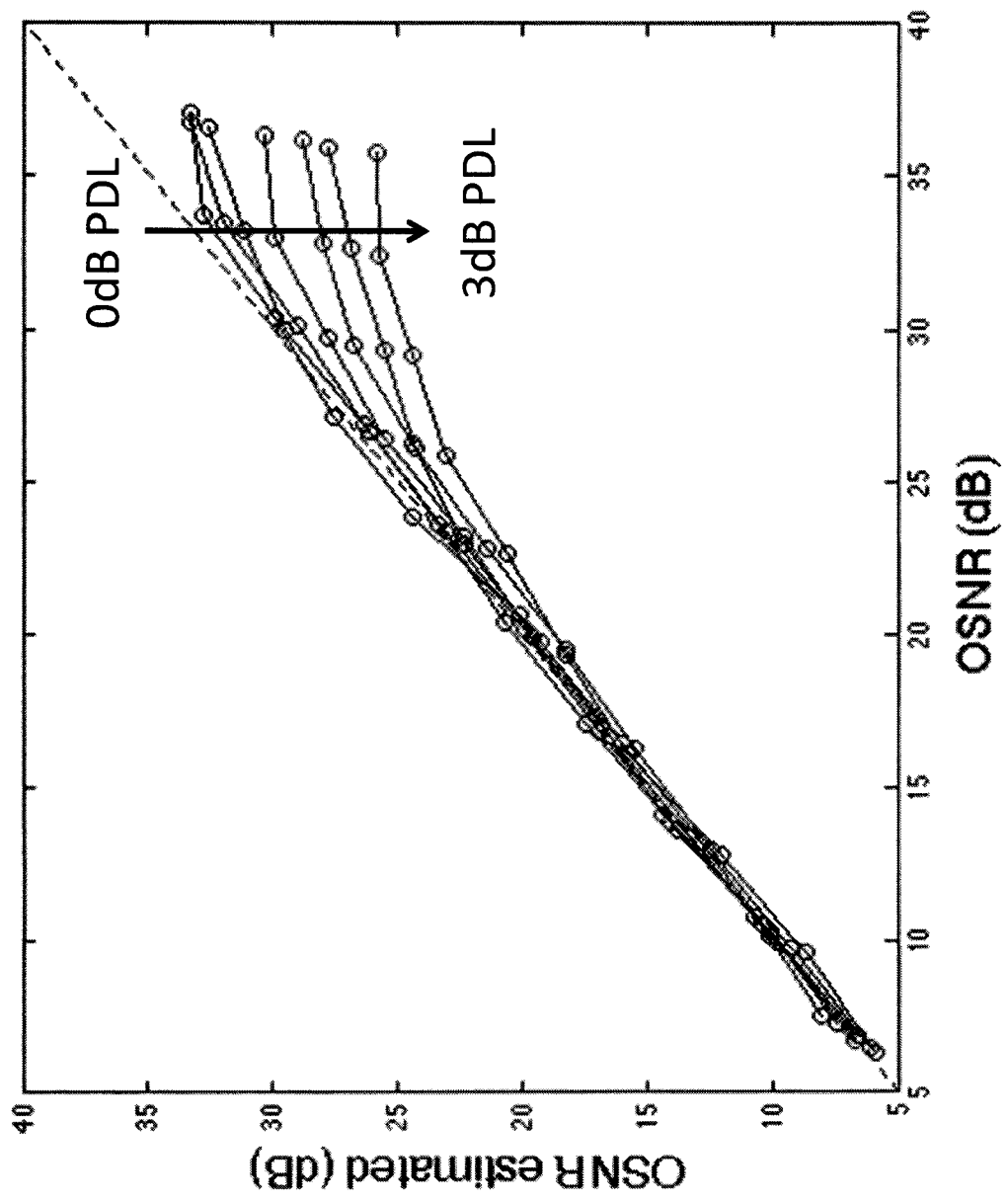
FIG. 21A and FIG. 21B are referred to together as FIG. 21 and are graphs showing the relationship between the OSNR determined by embodiments of the present invention and the "true" OSNR, in the case where the dc offset is due to power imbalance in the transmitter and wherein in FIG. 21A no correction is applied and in FIG. 21B the corrected ratio Γ'" is applied.
Figure 21B:
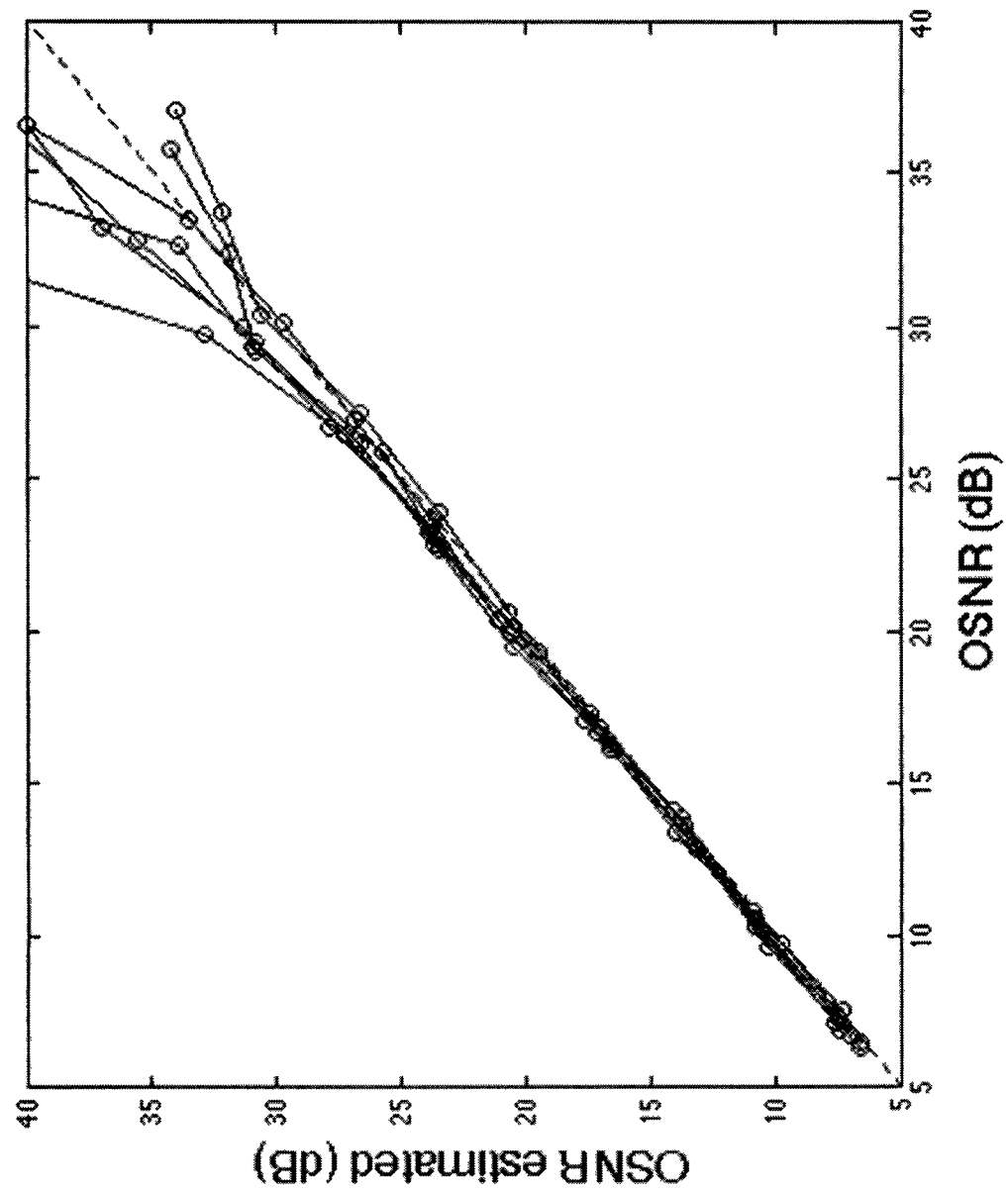

For this unbalanced transmitter case, the ratio $\Gamma$ may be compensated in a manner similar to that described above. By defining an effective PDL from the measured dc offset, i.e. from the same equation with the same constant, $PDL=DC_{offset}/0.11$. If this is applied to the ratio $\Gamma$ in the same way as detailed above, one can correct the OSNR estimation to take into account the unbalanced $P_x$ and $P_y$ values, as shown in FIGS. 21A and 21B.

Figure 22:
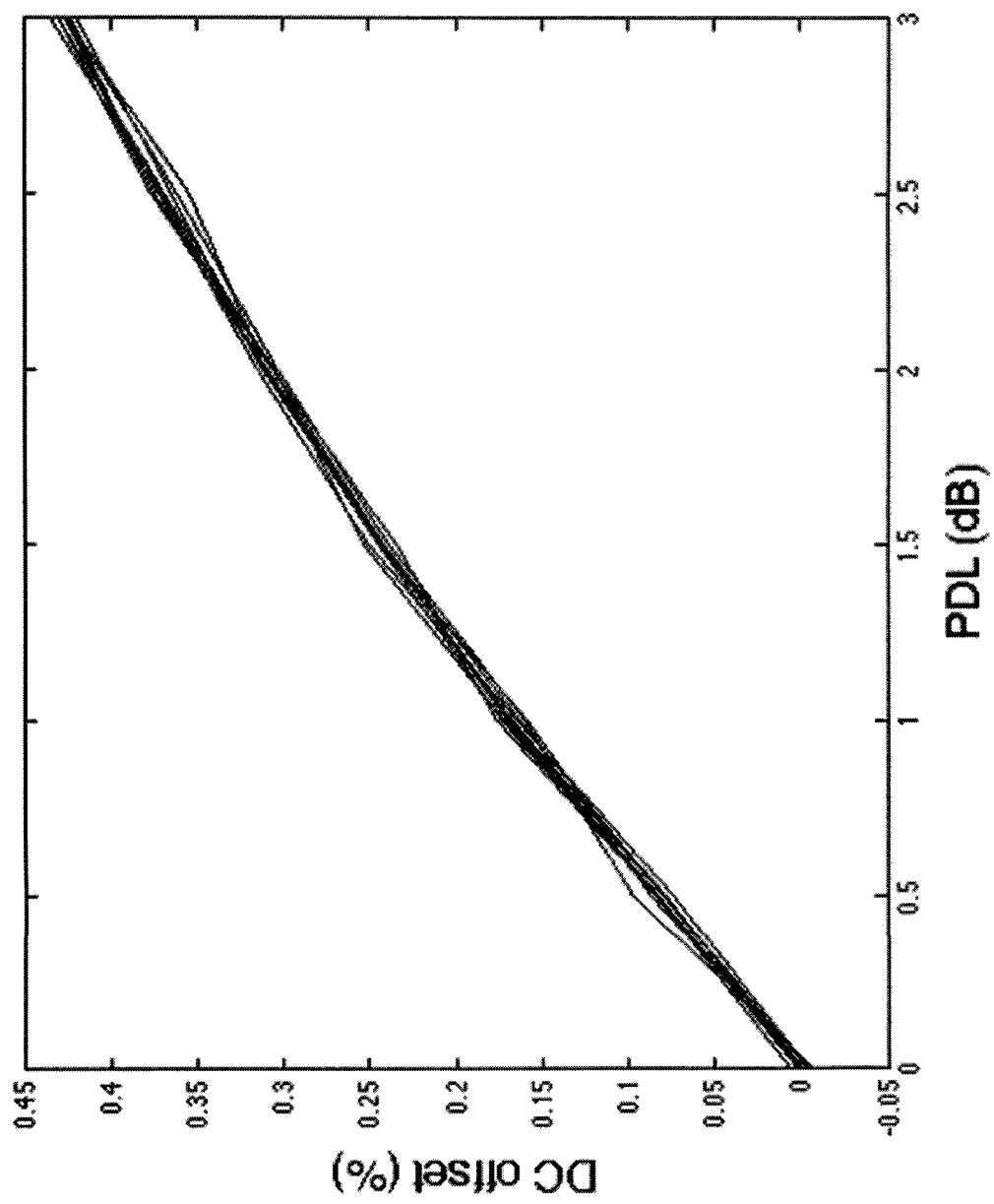
FIG. 22 is a graph showing the dc offset (in percentage) as a function of PDL (in dB) for the case where the PDL vector is aligned at 45 degrees with respect to the polarization-multiplexed components.

In the case of the PDL vector being aligned at 45 degrees to $E_x$ and $E_y$ (i.e. in this case in the $\hat{n}_2$ direction, i.e. the axis corresponding to the largest power after application of the SVD algorithm), the situation is similar, but the lens is distorted in a manner similar to that shown in FIG. 15. If the same analysis as that described above is undertaken to measure the dc offset, but with the PDL now along the $\hat{n}_2$ direction, one obtains the result shown in FIG. 22. Here the dc offset is nearly linear as a function of PDL (in dB). By applying a linear fit, the resulting slope is approximately 13% per dB of PDL, thereby enabling the PDL to be estimated from the dc offset. Then, in analogy to the steps described above with reference to the case where the PDL is aligned along $\hat{n}_1$, an appropriate correction factor can be determined and applied to the OSNR estimate.

Figure 23A:
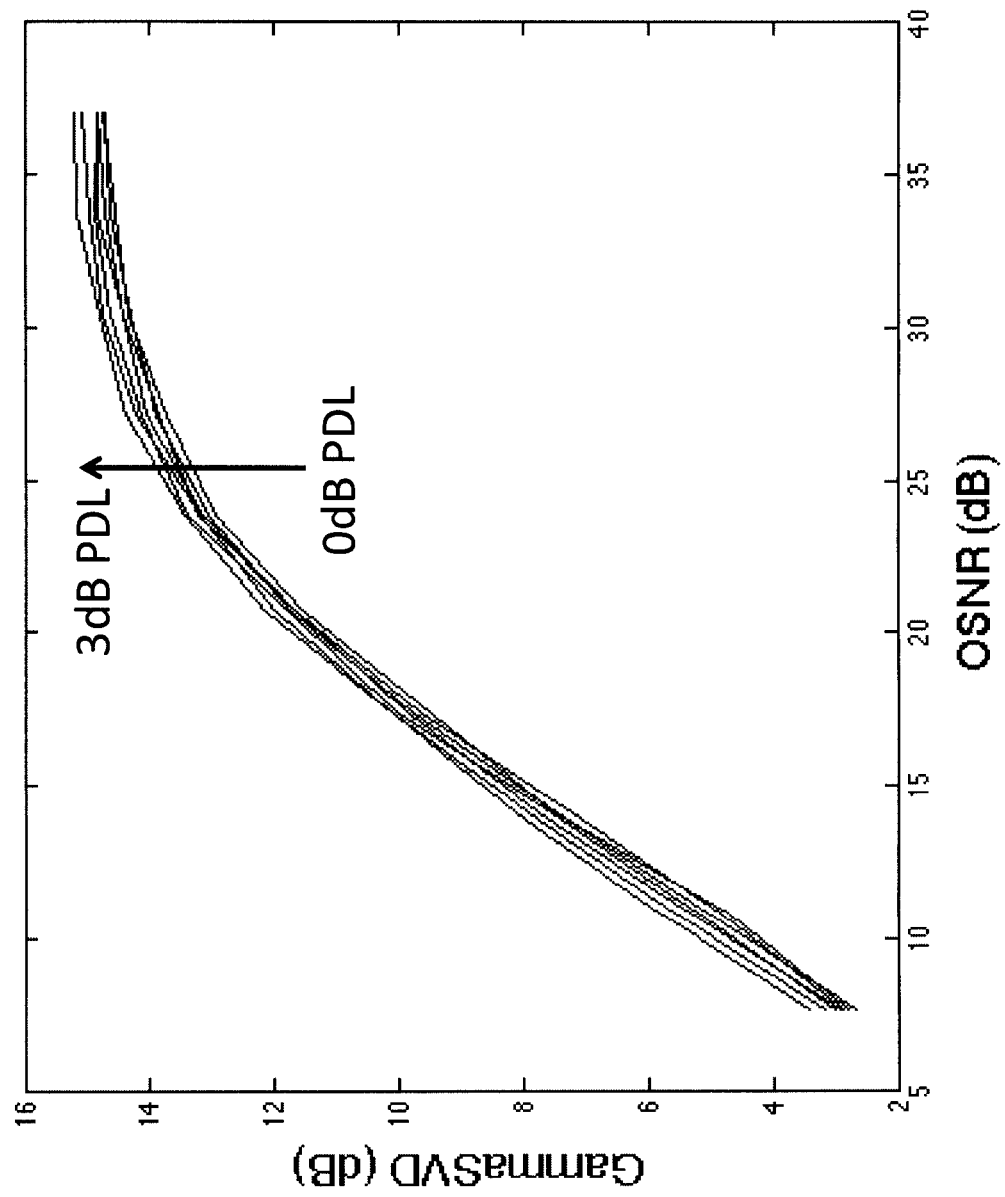
FIG. 23A and FIG. 23B are referred to together as FIG. 23 and are graphs showing the ratio Γ as a function of the OSNR when no PDL correction is applied, for the case where the PDL vector is aligned at 45 degrees with respect to the polarization-multiplexed components and wherein in FIG. 23A no correction is applied and in FIG. 23B a PDL correction is applied.
Figure 23B:
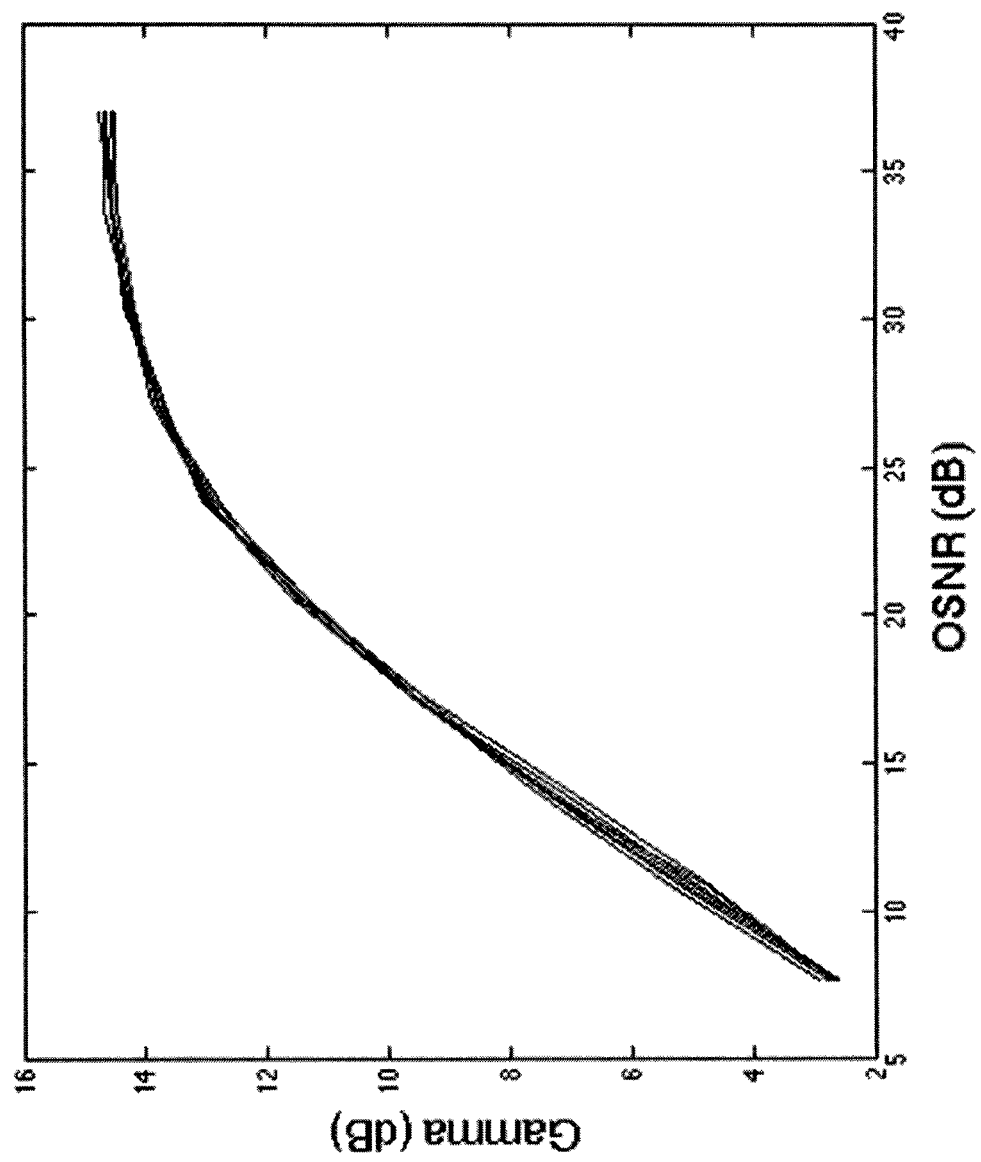
Figure 24A:
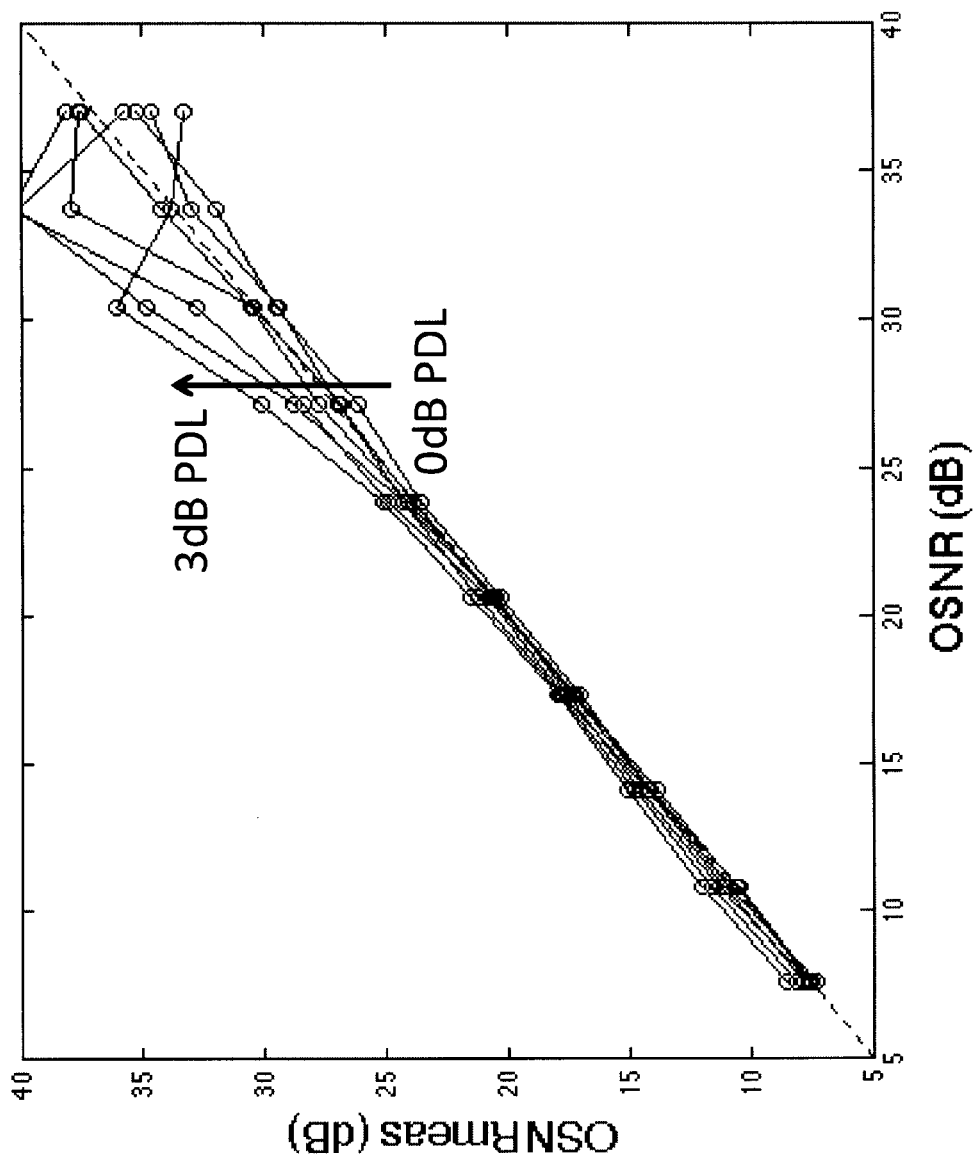
FIG. 24A and FIG. 24B are referred to together as FIG. 24 and are graphs showing the relationship between the OSNR determined by embodiments of the present invention and the "true" OSNR, in the case where the PDL vector is aligned at 45 degrees with respect to the polarization-multiplexed components and wherein in FIG. 24A no correction is applied and in FIG. 24B the corrected ratio Γ'" is applied.
Figure 24B:
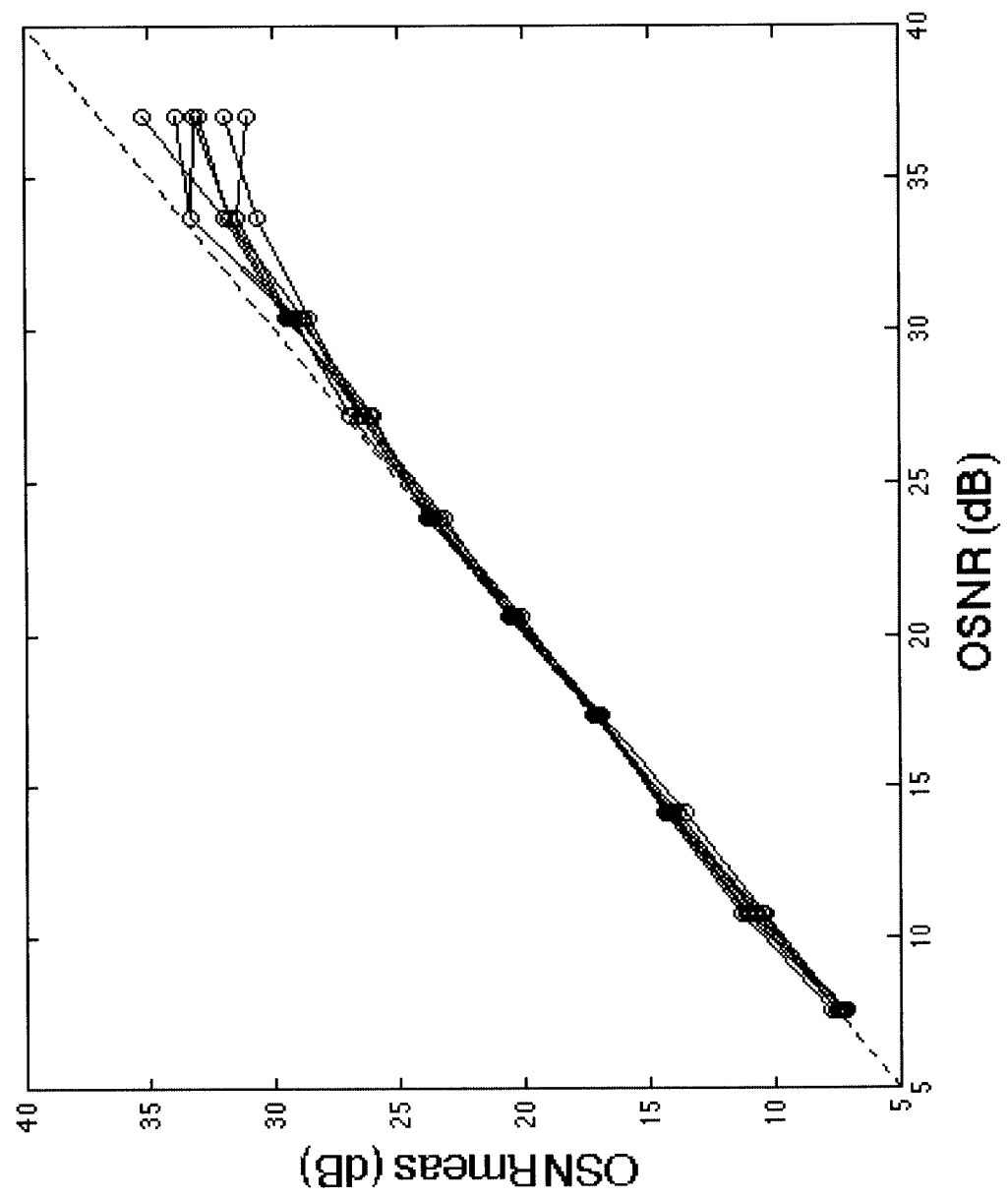

From FIG. 23A, one observes that the ratio $\Gamma$ increases slightly with increasing PDL. Consequently, a modified ratio $\Gamma''$ may be calculated as $\Gamma''=10^{-a_2 PDL/10}\Gamma$ where $a_2=\frac{1}{4}$, giving rise to the result plotted in FIG. 23B. The corresponding OSNR estimation can now be corrected in the same way as above, as shown in FIG. 24.

Figure 25:
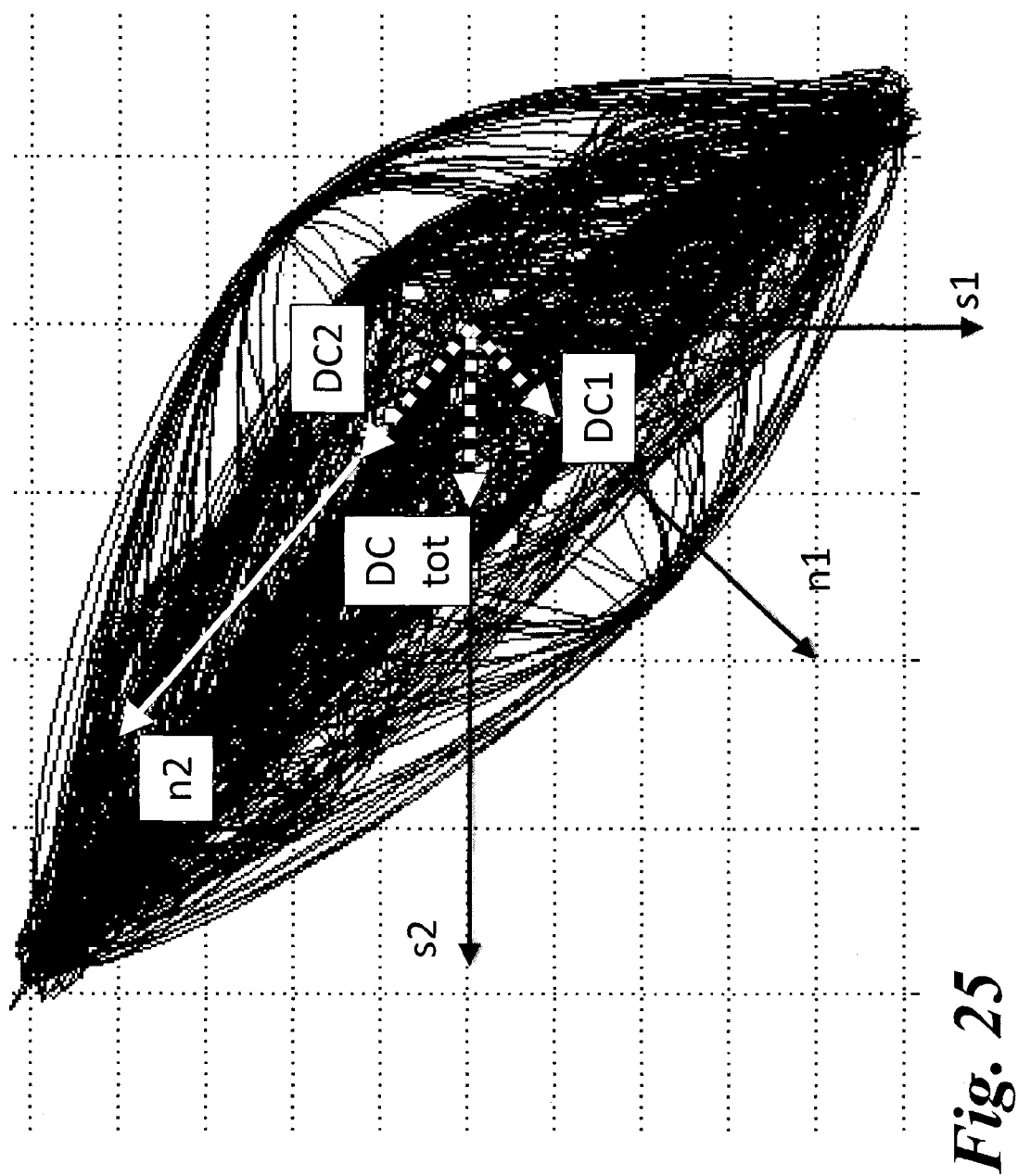
FIG. 25 is graph in Stokes-parameter space showing the lens-shaped distribution in presence of an arbitrarily aligned PDL vector.

For the case of an arbitrary angle of the PDL vector with respect to $E_x$ and $E_y$, the apparent shape of the lens becomes a mixture of the tulip shape and the skewed lens, as illustrated in FIG. 25. In an extension of the analysis presented above, an effective PDL vector calculated from the two dc offsets ($DC_1$ in the direction of the normal to the plane, $\hat{n}_1$, and $DC_2$ in the direction of the orthogonal vector corresponding to maximum response, $\hat{n}_2$, of the distorted lens) may be calculated.

Figure 26A:
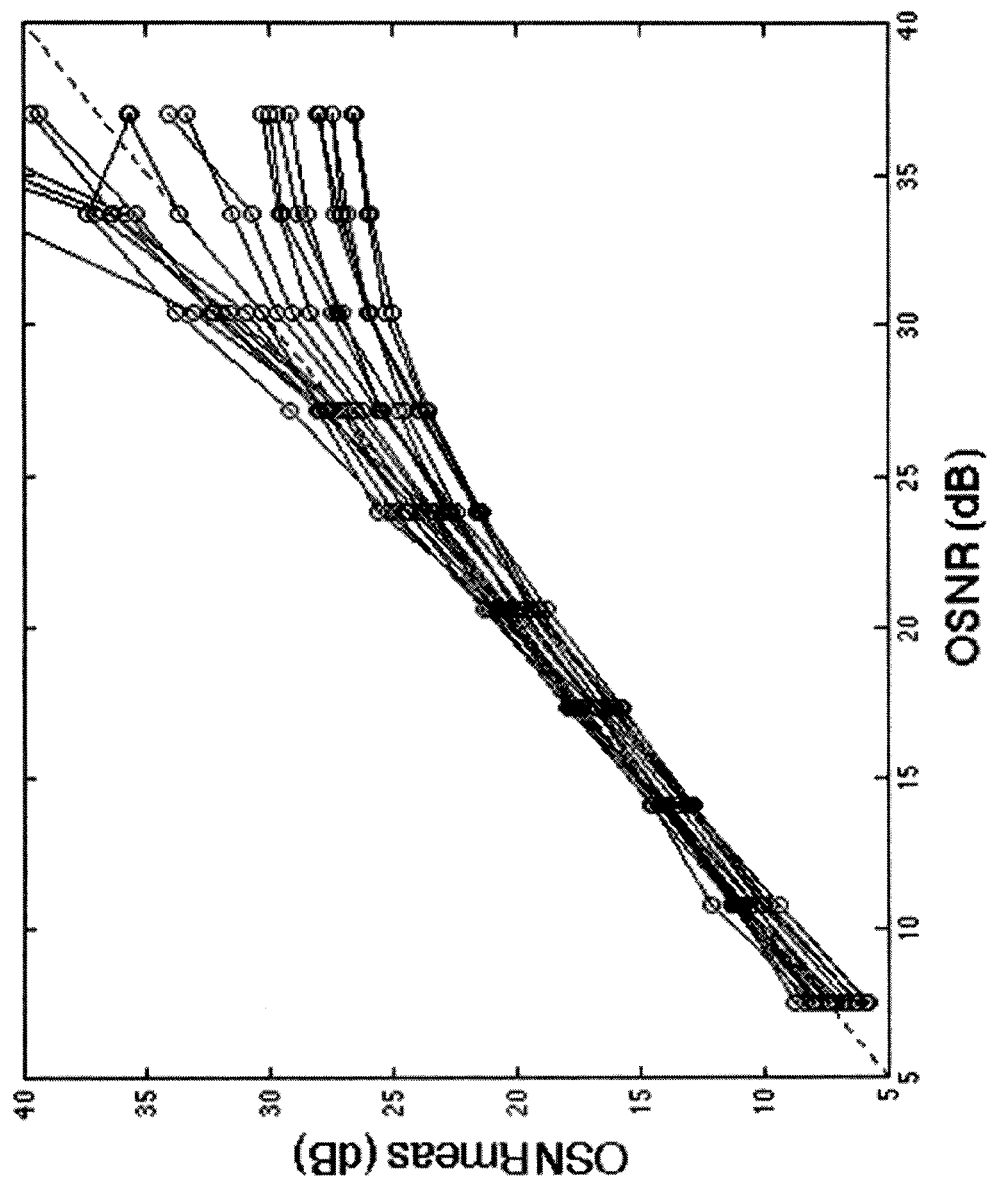
FIG. 26A and FIG. 26B, referred to collectively as FIG. 26, are graphs showing the relationship between the OSNR determined by embodiments of the present invention and the "true" OSNR, in the case where the PDL vector is arbitrarily aligned with respect to the polarization-multiplexed components and wherein in FIG. 26A no correction is applied and in FIG. 26B the corrected ratio Γ'" is applied.
Figure 26B:
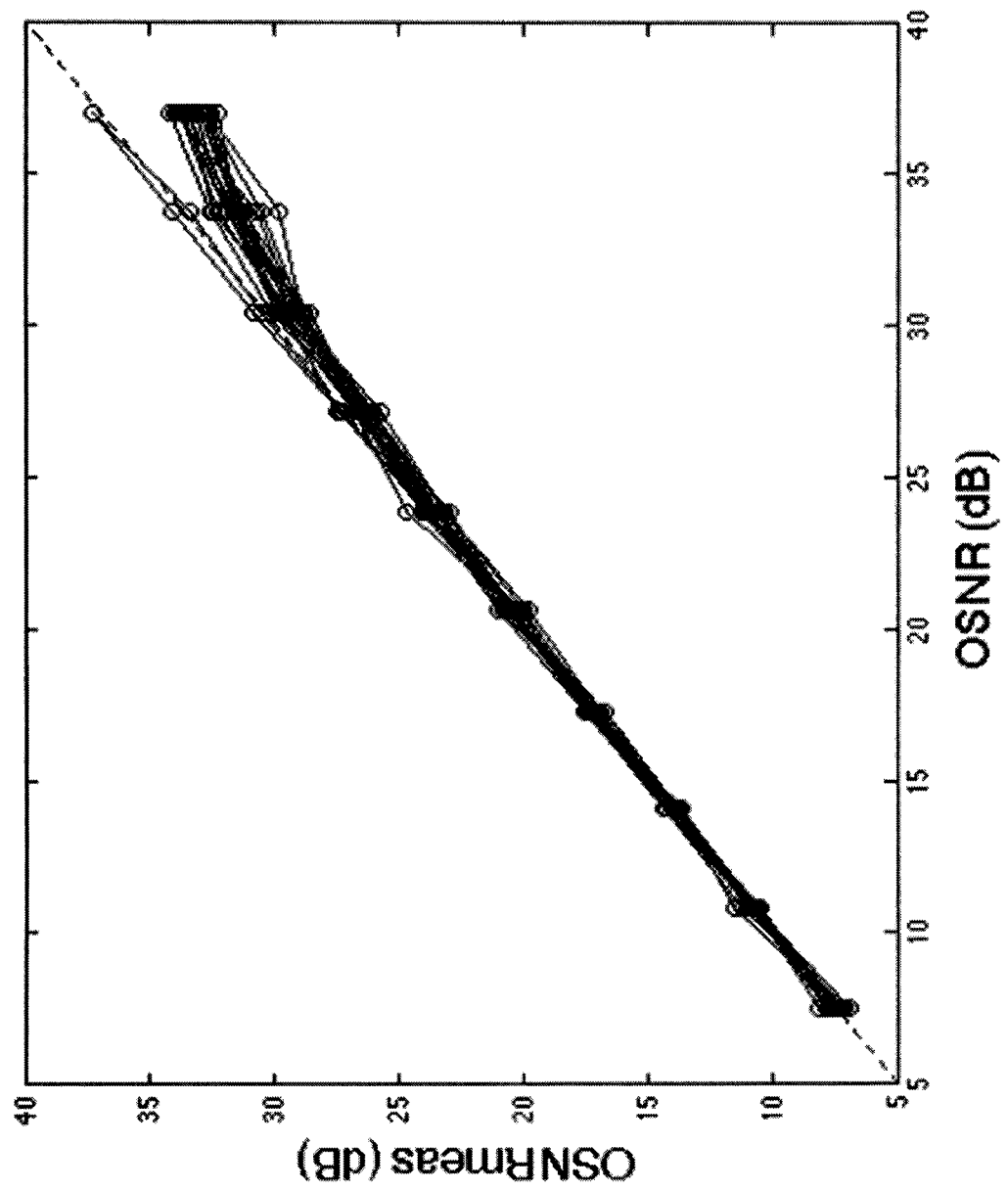

This effective PDL vector (a linear combination of two vectors) may then serve as input to a correction factor $\Gamma'''=10^{a_1 PDL_{n1,dB}/10} \, 10^{-a_2 PDL_{n2,dB}/10} \, \Gamma$. The result is shown in FIGS. 26A and 26B for a set of random SOPs (each line represents one random input SOP, evenly distributed on the Poincaré sphere) input into a fixed 3-dB PDL element.

There may also be a small dc offset ($=k_3 * PDL_{dB}$, where $k_3=k_2$) in the $\hat{n}_3$ direction whose contribution to the correction term is normally small, but preferably should still be taken into account when calculating the total PDL. For instance, the total PDL may be determined from the equation:

$$PDL_{tot}=(PDL_{n1}^2+PDL_{n2}^2+PDL_{n3}^2)^{1/2} \qquad (9)$$

What is claimed is:

1. A method for estimating an Optical Signal-to-Noise Ratio (OSNR), on a polarization-multiplexed optical Signal-Under-Test (SUT) comprising two polarized phase-modulated data-carrying contributions and an optical noise contribution, the method comprising:
   for each of a multiplicity of distinct polarization-analyzer conditions, analyzing said SUT to provide at least one polarization-analyzed component of the SUT and detecting said at least one component with an electronic bandwidth at least ten times smaller than the symbol rate of said SUT to obtain a corresponding acquired electrical signal;
   for each acquired electrical signal, determining a value of a statistical parameter from the ac component of the acquired electrical signal, thereby providing a set of statistical-parameter values corresponding to said multiplicity of distinct polarization-analyzer conditions; and
   mathematically determining, from the set of statistical-parameter values, said OSNR representative of said optical noise contribution.

2. The method as claimed in claim 1, wherein for each of said distinct polarization-analyzer conditions, the SUT is simultaneously analyzed according to two mutually-orthogonal states of polarization, the corresponding acquired electrical signal being a differential electrical signal proportional to the difference between two mutually-orthogonal polarization-analyzed components of the SUT.

3. The method as claimed in claim 2, wherein the acquired electrical signal is ac-coupled.

4. The method as claimed in claim 3, wherein said statistical parameter corresponds to a measured rms value of the differential electrical signal.

5. The method as claimed in claim 1, wherein said multiplicity of polarization-analyzer conditions comprise three conditions that are mutually orthogonal in Stokes-parameter space, thereby providing a set of three statistical-parameter values corresponding to respective Stokes-parameter values, and wherein the three polarization-analyzer conditions are obtained simultaneously.

6. The method as claimed in claim 5, wherein said mathematically determining comprises calculating, from said set of statistical-parameter values, a thickness parameter related to a deformation of a lens-shaped distribution in Stokes-parameter space defined by polarization-analyzed components corresponding to the three polarization-analyzer conditions, said deformation being at least partly induced from said optical noise contribution, and wherein said mathematically determining further comprises determining said OSNR as a predetermined function of said thickness parameter.

7. The method as claimed in claim 1, wherein said polarization-analyzer conditions are obtained successively using at least one polarization beam splitter and a polarization controller to vary a state of polarization of the SUT at the input of the polarization beam splitter.

8. The method as claimed in claim 7, wherein said mathematically determining said OSNR comprises calculating a thickness parameter at least from a minimum of said set of statistical-parameter values and estimating said OSNR based on a predetermined function of said thickness parameter.

9. The method as claimed in claim 8, wherein said calculating a thickness parameter comprises calculating said thickness parameter from a ratio of a maximum to a minimum of said set of statistical-parameter values.

10. The method as claimed in claim 1, wherein the electronic bandwidth of said differential electrical signal is between one over a hundred thousand to one over a hundred of the symbol rate of each of said modulated signal carriers of said SUT.

11. The method as claimed in claim 1, wherein the electronic bandwidth of said differential electrical signal is between one over a ten thousand to one over a thousand of the symbol rate of each of said modulated signal carriers of said SUT.

12. The method as claimed in claim 1, further comprising determining a value of a dc component of each acquired electrical signal and determining a value representative of a polarization dependent loss therefrom.

13. The method as claimed in claim 12, wherein said mathematically determining said OSNR accounts for said polarization dependent loss.

14. The method as claimed in claim 1, further comprising determining a value representative of an effective differential group delay and wherein said mathematically determining said OSNR accounts for said effective differential group delay.

15. The method as claimed in claim 1, wherein a modulation format corresponding to said data-carrying contributions is a single-amplitude phase-modulation format.

16. A system for estimating an in-band noise parameter on a polarization-multiplexed optical Signal-Under-Test (SUT) comprising two polarized phase-modulated data-carrying contributions and an optical noise contribution, the system comprising:
- a polarization-optics arrangement for analyzing said SUT according to each of a multiplicity of distinct polarization-analyzer conditions to provide at least one polarization-analyzed component of the SUT;
- at least one optical detector to obtain a corresponding electrical signal, said optical detector having an electronic bandwidth at least ten times smaller than the symbol rate of said SUT;
- a true-rms converter receiving said electrical signal for determining a value of a statistical parameter from the ac component of the electrical signal, thereby providing a set of statistical-parameter values corresponding to said multiplicity of distinct polarization-analyzer conditions; and
- a noise calculator receiving said set of statistical-parameter values and configured for mathematically determining therefrom said in-band noise parameter representative of said optical noise contribution.

17. The system as claimed in claim 16, wherein said polarization-optics arrangement comprises a polarization beam splitter for analyzing the SUT simultaneously according to two mutually-orthogonal states of polarization for each of said distinct polarization-analyzer conditions, said at least one optical detector comprising at least two optical detectors corresponding respectively to the two mutually-orthogonal polarization-analyzed components of the SUT, said amplifier being a differential amplifier to provide a differential electrical signal proportional to the difference between two mutually-orthogonal polarization-analyzed components of the SUT.

18. The system as claimed in claim 16, wherein said polarization-optics arrangement comprises a polarization controller to vary a state of polarization of the SUT at the input of the polarization beam splitter in order to provide successively said polarization-analyzer conditions, said polarization-analyzer conditions being arbitrary relative to one another.

19. The system as claimed in claim 18, wherein said noise calculator is configured for calculating a thickness parameter at least from a minimum of said set of statistical-parameter values and for estimating said in-band noise parameter based on a predetermined function of said thickness parameter.

20. The system as claimed in claim 19, wherein said noise calculator is configured for calculating said thickness parameter from a ratio of a maximum to a minimum of said set of statistical-parameter values.

21. The system as claimed in claim 16, wherein said polarization-optics arrangement comprises a polarimeter for analyzing the SUT simultaneously according to three conditions that are mutually orthogonal in Stokes-parameter space, thereby providing a set of three statistical-parameter values corresponding to Stokes-parameter values.

22. The system as claimed in claim 21, wherein said noise calculator is configured for calculating, from said set of statistical-parameter values, a thickness parameter related to a deformation of a lens-shaped distribution in Stokes-parameter space defined by polarization-analyzed components corresponding to the three polarization-analyzer conditions, and wherein said noise calculator is further configured for determining said in-band noise parameter as a predetermined function of said thickness parameter.

23. The system as claimed in claim 16, wherein the electronic bandwidth of said differential electrical signal is between one over a hundred thousand to one over a hundred of the symbol rate of each of said modulated signal carriers of said SUT.

24. The system as claimed in claim 16, wherein the electronic bandwidth of said optical detector is between one over a ten thousand to one over a thousand of the symbol rate of each of said modulated signal carriers of said SUT.

25. The system as claimed in claim 23, wherein said in-band noise-related parameter is an optical signal-to-noise ratio.

26. The system as claimed in claim 16, wherein a modulation format corresponding to said data-carrying contributions is a single-amplitude phase-modulation format.

\* \* \* \* \*